United States Patent
Miyoshi et al.

(10) Patent No.: US 9,781,278 B2
(45) Date of Patent: Oct. 3, 2017

(54) SOLID-STATE IMAGE SENSOR AND IMAGE READING APPARATUS

(71) Applicants: Yuuya Miyoshi, Osaka (JP); Tohru Kanno, Osaka (JP)

(72) Inventors: Yuuya Miyoshi, Osaka (JP); Tohru Kanno, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/411,290

(22) Filed: Jan. 20, 2017

(65) Prior Publication Data
US 2017/0244844 A1   Aug. 24, 2017

(30) Foreign Application Priority Data

Feb. 18, 2016   (JP) ................................ 2016-029297

(51) Int. Cl.
*H04N 1/04* (2006.01)
*H04N 1/00* (2006.01)

(52) U.S. Cl.
CPC ..... *H04N 1/00013* (2013.01); *H04N 1/00907* (2013.01); *H04N 1/0461* (2013.01); *H04N 2201/0081* (2013.01); *H04N 2201/0094* (2013.01)

(58) Field of Classification Search
CPC ............. H04N 1/00013; H04N 1/0461; H04N 1/00907; H04N 2201/0081; H04N 2201/0094

USPC ................................ 358/482, 474, 497, 498
See application file for complete search history.

(56) References Cited

U.S. PATENT DOCUMENTS 9,131,183 B2 * 9/2015 Miyoshi ................. H04N 1/409
2013/0162870 A1   6/2013 Miyoshi et al.

FOREIGN PATENT DOCUMENTS

| JP | 2006-025189 | 1/2006 |
| JP | 2009-177797 | 8/2009 |
| JP | 2012-065106 | 3/2012 |

* cited by examiner

*Primary Examiner* — Houshang Safaipour
(74) *Attorney, Agent, or Firm* — Oblon, McClelland, Maier & Neustadt, L.L.P.

(57) ABSTRACT

A solid-state imaging device includes a pixel circuit including a plurality of photoelectric conversion elements and configured to output a signal level and a reset level, an analog correlated double sampling (CDS) circuit connected to the pixel circuit and configured to perform correlated double sampling in an analog region based on the signal level and the reset level and output a result of the correlated double sampling, an analog-digital (AD) conversion circuit connected to the analog CDS circuit and configured to convert two different analog signals output from the analog CDS circuit into two digital signals, a signal processing circuit connected to the AD conversion circuit and configured to obtain a difference between the two different digital signals output from the AD conversion circuit; and a reference voltage generating circuit to output a first reference voltage that defines a clamp level of the analog CDS circuit.

9 Claims, 22 Drawing Sheets

SOLID-STATE IMAGE SENSOR AND IMAGE READING APPARATUS

CROSS-REFERENCE TO RELATED APPLICATION

This patent application is based on and claims priority pursuant to 35 U.S.C. §119(a) to Japanese Patent Application No. 2016-029297, filed on Feb. 18, 2016, in the Japan Patent Office, the entire disclosure of which is hereby incorporated by reference herein.

BACKGROUND

Technical Field

Embodiments of the disclosure relate to a solid-state image sensor and an image reading apparatus.

Related Art

The known solid-state image sensors, having an image reading function, have been used for imaging apparatuses such as multifunction peripherals and scanners. Such sensors include a pixel circuit for photoelectric conversion and peripheral circuits thereof including a driving circuit and a signal processing circuit. The solid-state image sensor has a column configuration with the plurality of circuits mentioned above. With this configuration, the plurality of pixel circuits and the peripheral circuits can be integrated using complementary metal oxide semiconductor (CMOS) processing technology.

Signals output form the solid-state image sensor include solid-state noise due to characteristics of the pixel circuit. To reduce the solid-state noise, the solid-state image sensor usually has a cadmium sulfide (CDS) circuit.

Using only the CDS circuit in an analog area, however, may not be enough to reduce the solid-state noise. In place of such a solid-state image sensor using the CDS circuit in the analog area, a solid-state image sensor that calculates, in a digital area, a difference between a signal level and a reset level output from a pixel block to remove the solid-state noise is known.

SUMMARY

In particular, a novel solid-state imaging device is described that includes a pixel circuit including a plurality of photoelectric conversion elements, and configured to output a signal level and a reset level, an analog correlated double sampling (CDS) circuit connected to the pixel circuit and configured to perform correlated double sampling in an analog region based on the signal level and the reset level and output a result of the correlated double sampling, an analog-digital (AD) conversion circuit connected to the analog CDS circuit and configured to convert two different analog signals output from the analog CDS circuit into two digital signals, a signal processing circuit connected to the AD conversion circuit and configured to obtain a difference between the two different digital signals output from the AD conversion circuit; and a reference voltage generating circuit to output a first reference voltage that defines a clamp level of the analog CDS circuit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

Figure 1:
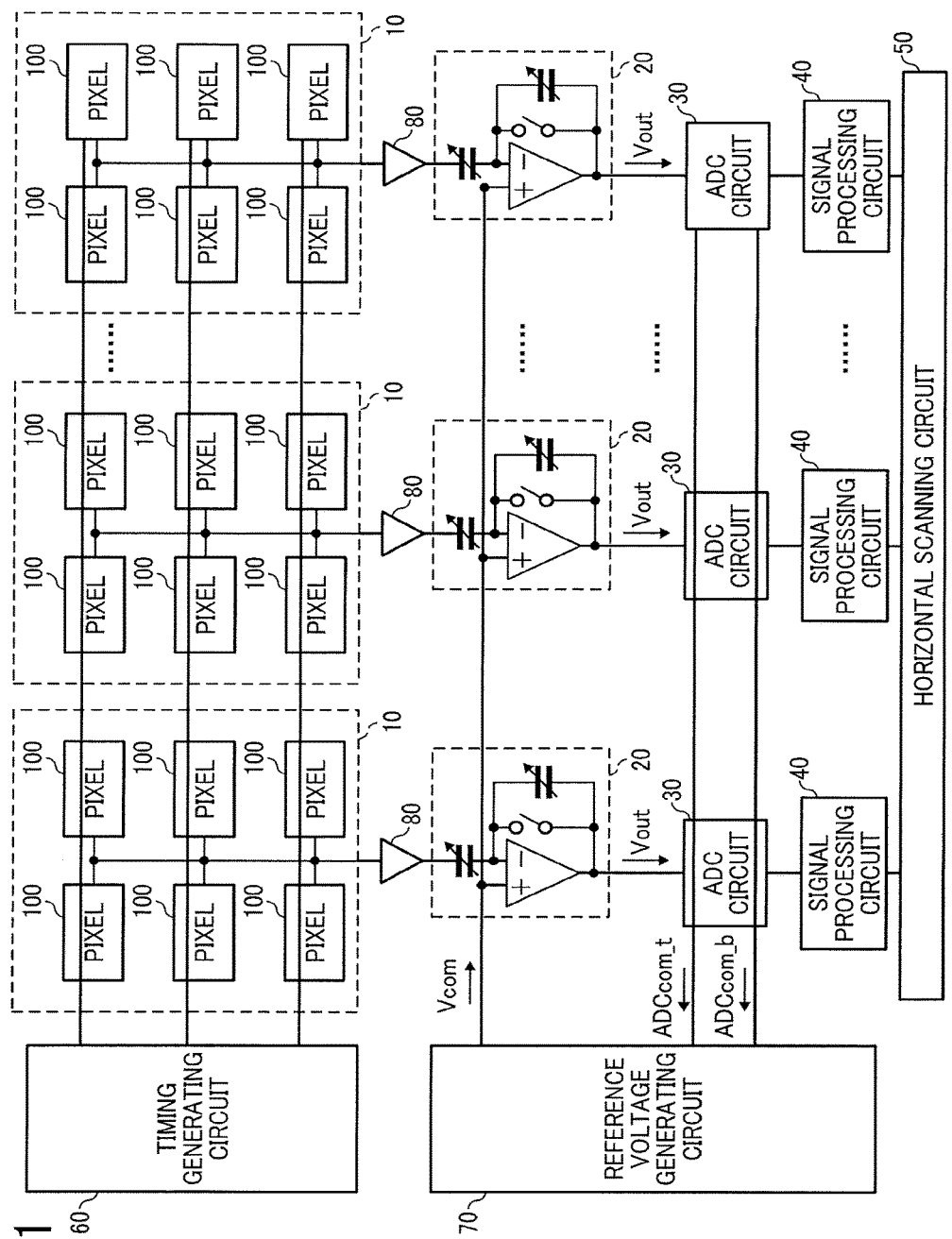
FIG. 1 is a block diagram illustrating an exemplary configuration of a solid-state image sensor according to an embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing example embodiments illustrated in the drawings, specific terminology is employed for the sake of clarity. However, the present disclosure is not intended to be limited to the specific terminology so selected and it is to be understood that each specific element includes all technical equivalents that, have the same function, operate in a similar manner, and achieve the same result. Herein, in this disclosure, the terms "image sensor" and "imaging device" indicate the same thing.

A conventional solid-state image sensor that calculates, in a digital area, a difference between a signal level and a reset level output from a pixel block has been used to cope with circuit noise. Such a conventional solid-state image sensor, however, still has additional problems. For example, the sensor increases the number of switches in a signal reading circuit, and the greater the number of switches in the signal reading circuit, the greater the switching noise caused by operation of the switches. Increasing the switching noise may cause fluctuation of a reference voltage used for sampling a signal level and a reset level.

When the reference voltage fluctuates in reading a signal, in particular at high speed, the risk of a wrong reading of the signal level and the reset level may be increased in some cases depending on sample timing. That is, the switching noise may affect readings of signal level and reset level and cause the wrong values of signal level and reset level, and the wrong readings draws a wrong reading of difference between the signal level and the reset level. The wrong reading of difference lowers efficiency to reduce solid-state noise, and thus accuracy of an image signal output from the solid-state image sensor also declines. Thus there is room for improvement in regarding image signal accuracy in reading the signal at high speed.

Additionally, such a conventional solid-state image sensor includes a number of signal reading circuits, and each signal reading circuit increases in its size according to increase of the number of the switches therein, resulting in increasing the entire size of the solid-state image sensor. Smaller solid-state image sensors, however, are desired for use in, for example, video cameras and digital cameras in addition to multifunction peripherals and scanners.

Furthermore, in such a conventional solid-state image sensor, signals that are not supposed to be output may be output in some columns that are placed around a part of columns related to a pixel circuit receiving a large amount of light. Such false signal outputs causes, for example, "blackening" and "black floating", and lowers qualities of image signals output from the solid-state image sensor, accordingly. Such a conventional solid-state image sensor, accordingly, also needs to prevent the false signal outputs when partially receiving a large amount of light.

First Embodiment of Solid-State Image Sensor

FIG. 1 is a schematic block diagram illustrating a hardware configuration of a complementary metal oxide semiconductor (CMOS) sensor 1 that is a solid-state image sensor according to one embodiment of the disclosure.

The CMOS sensor 1 is configured, for example, as a CMOS line sensor. As described in FIG. 1, the CMOS sensor 1 includes pixel circuits 10, analog-correlated double sampling (A-CDS) circuits 20, analog-to-digital conversion (ADC) circuits 30, signal processing circuits 40, a horizontal scanning circuit 50, a timing generating circuit 60, a reference voltage generating circuit 70, and second amplifiers 80.

The pixel circuit 10 includes a plurality of pixel blocks 100. Each pixel block 100 includes a plurality of photoelectric conversion elements each having a photoelectric conversion function, which is described later. Each photoelectric conversion element of the pixel block 100 outputs a charge corresponding to an intensity of received light. The pixel block 100 converts accumulated charges output from the photoelectric conversion element into an electric signal to be output. This electric signal is referred to as a "signal level". The pixel block 100 also converts a reset state, where the charges from the photoelectric conversion element are reset, into an electric signal to be output. This electric signal is referred to as a "reset level". The timing generating circuit 60 controls when to output the signal level and the reset level of the pixel block 100. A detailed configuration of the pixel block 100 will be described later.

The A-CDS circuit 20 is an analog CDS circuit that performs correlated double sampling (CDS) processing in an analog area. The A-CDS circuit 20 clamps and outputs signal levels that are amplified with the second amplifier circuit 80, and also outputs a difference between the signal level and the reset level. A detailed configuration of the A-CDS circuit 20 will be described later.

The ADC circuit 30 is an analog to digital (AD) conversion circuit that converts an analog signal output from the A-CDS circuit 20 into a digital signal. The ADC circuit 30 converts the signal levels, which are output from the A-CDS circuit 20, into digital signal levels to be output. The ADC circuit 30 also converts the difference between the signal level and the reset level, which is output from the A-CDS circuit 20, into a digital signal to be output.

The signal processing circuit 40 retrieves difference components of the two digital signals output from the ADC circuit 30 and generates and outputs another digital signal of which components of solid-state noise are removed.

The horizontal scanning circuit 50 sequentially outputs the digital signals generated at the signal processing circuit 40 at a predetermined rate.

The timing generating circuit 60 outputs signals to control the operation of each pixel block 100 included in the pixel circuit 10.

The reference generating circuit 70 generates and outputs a clamp reference voltage (Vcom), which is a first reference voltage, used by the A-CDS circuit 20 for clamping the signal level. The reference voltage generating circuit 70 also generates and outputs a clip reference voltage (Vcom_C), which is a second reference voltage, used by a clip circuit 90, which will be described later. A detailed configuration of the reference generating circuit 70 will be described later.

The second amplifier circuit 80 amplifies and then outputs the signal level and the reset level output from the pixel block 100. A detailed configuration of the second amplifier circuit 80 will be described later.

The CMOS sensor 1 having the above-mentioned elements has a CMOS configuration that has an advantage to be formed with a plurality of circuits integrated.

Configuration of Pixel Circuit

Figure 2:
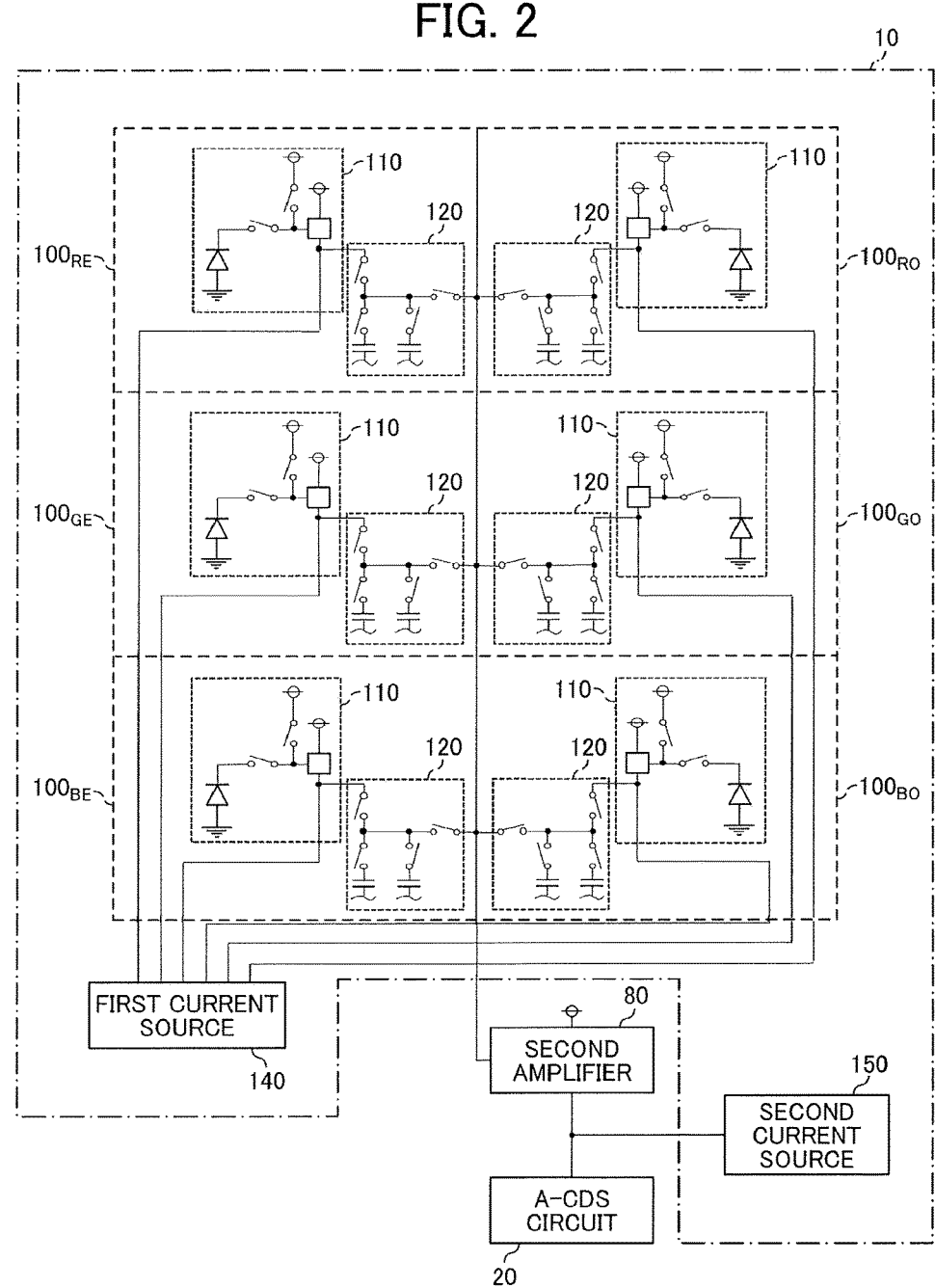
FIG. 2 is a schematic block diagram illustrating a configuration of a pixel circuit of the solid-state image sensor according to the embodiment.

Referring to FIG. 2, there is illustrated a configuration of the pixel circuit 10 included in the CMOS sensor 1. FIG. 2 is a schematic block diagram illustrating the detailed configuration of the pixel circuit 10. The pixel circuit 10 has a column configuration that has a set of the plurality of pixel blocks 100. Each set corresponds to, for example, one of three colors, red (R), green (G), and blue (B), and outputs a corresponding signal. In the CMOS sensor 1, three color filters forms a set. In the plurality of pixel blocks of the CMOS sensor 1, a pair of pixel blocks 100 aligned in a perpendicular direction in relation to the set of the three color filters configures one unit.

The pixel circuit 10, for example, includes six pixel blocks 100 (R pixel block $100_{RE}$, R pixel block $100_{RO}$, G pixel block $100_{GE}$, G pixel block $100_{GO}$, B pixel block $100_{BE}$, and B pixel block $100_{BO}$). The pixel circuit 10 also includes a first current source 140 and a second current source 150. The pixel circuit 10 serves as a photoelectric conversion section.

The pixel circuit 10 sequentially reads out the signal level and the reset level according to control signals output from the timing generating circuit 60. For example, the pixel circuit 10, at first, reads the signal level from the R pixel block $100_{RE}$ and then reads the reset level from the R pixel block $100_{RE}$. Subsequently, the pixel circuit 10 reads the signal level from the R pixel block $100_{RO}$ and then reads the reset level from the R pixel block $100_{RO}$. In the same sequence, the pixel circuit 10 reads the signal level and the reset level from the G pixel block $100_{GE}$, the G pixel block $100_{GO}$, the B pixel block $100_{BE}$, and the B pixel block $100_{Bo}$.

The R pixel block $100_{RE}$ and the R pixel block $100_{RO}$ includes a color filter and an on-chip microlens that allow red light to pass. Similarly, the G pixel block $100_{GE}$ and the G pixel block $100_{GO}$ includes a color filter and an on-chip microlens that allow a green light to pass. The B pixel block $100_{BE}$ and the B pixel block $100_{BO}$ include a color filter and an on-chip microlens that allow a blue light to pass.

A configuration of the R pixel block $100_{RE}$ is the same with a configuration of the R pixel block $100_{RO}$. The G pixel block $100_{GE}$, the G pixel block $100_{GO}$, the B pixel block $100_{BE}$, and the B pixel block $100_{BO}$ also individually have the same configuration with the configuration of the R pixel block $100_{RE}$, except for a configuration of color filter, which defines a color of light to receive. The R pixel block $100_{RE}$ is used in the following explanation as a representative of the pixel blocks 100. The "pixel block 100" may also be used in the following description when a matter in common to all of the above mentioned pixel blocks 100 is described.

Additionally, in the pixel circuit 10 of the CMOS sensor, the number of pixel blocks 100 in a column is not limited to six. The CMOS sensor 1 also may include in the pixel circuit 10 a controller to control portions of the CMOS sensor 1.

Figure 3:
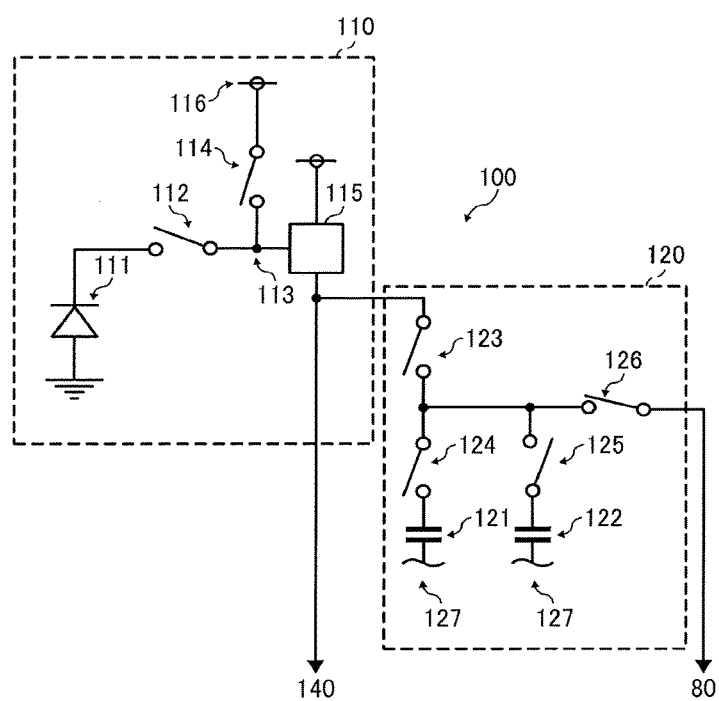
FIG. 3 is a circuit diagram illustrating a configuration of a pixel block of the solid-state image sensor according to the embodiment.

FIG. 3 is a circuit diagram illustrating a configuration of the R pixel block 100RE included in the CMOS sensor 1. The R pixel block $100_{RE}$ includes a pixel 110 and a memory 120. The R pixel block $100_{RE}$ receives a red light and performs the photoelectric conversion of the received red light.

The pixel 110 includes a light receiving element 111 (PD), a transfer switch 112 (TX), a floating diffusion (FD) region 113, a reset switch 114 (RT), a first amplifier 115 (SF1), and a reset power supply 116.

The light receiving element 111, such as a photodiode, for example, is a photoelectric conversion element that generates an electrical charge corresponding to an amount of incident light received via the color filter. An anode of the light receiving element 111 is connected to ground and a cathode is connected to the transfer switch 112.

The transfer switch 112 is disposed between the light receiving element 111 and the first amplifier 115. The transfer switch 112 has one terminal connected to the light receiving element 111 and the other terminal connected to the reset switch 114 and the first amplifier 115. Based on the operation of the transfer switch 112, the charge generated by the light receiving element 111 is transferred to the FD region 113.

The FD region 113 is a floating diffusion region in which the transfer switch 112, the first amplifier 115, and the reset switch 114 are connected to each other. The FD region 113 serves as a charge-voltage conversion section that converts the transferred charge into a voltage.

The reset switch 114 is configured, for example, as a transistor. The reset switch 114 has one terminal connected to the reset power supply 116 and the other terminal connected to the FD region 113. When the reset switch 114 turns on (closes contacts thereof), a reset voltage (Vrd) from the reset power supply 116 is applied to the FD region 113. At that time, the charge transferred from the light receiving element 111 and stored in the FD region 113 is reset.

The first amplifier 115 is configured, for example, as a MOS transistor. The first amplifier 115 amplifies the voltage, which is converted from the electric charge at the FD region 113, and outputs the amplified voltage to a post-stage. The first amplifier 115 that is oversized influences on a capacity of the FD region 113, and efficiency of converting the charge into a voltage decreases, accordingly. The size of the first amplifier 115, accordingly, is desired to be smaller than the second amplifier circuit 80, which is described later.

The memory 120 includes a first memory capacitor 121 (Cr), a second memory capacitor 122 (Cs), a first selection switch 123 (SL), a reset level selection switch 124 (RDR), a signal level selection switch 125 (RDS), and a second selection switch 126 (SW).

The first memory capacitor 121 is, for example, a MOS capacitor and accumulates electronic charge when the pixel 110 is reset. A signal generated based on the electronic charge accumulated in the first memory capacitor 121 is a "reset level" of the pixel 110. The second memory capacitor 122 is, for example, a MOS capacitor and accumulates electronic charge transferred from the pixel 110 to the FD region 113. A signal generated based on the electronic charge accumulated in the second memory capacitor 122 is a "signal level" of the pixel 110.

One side of the electrodes of each of the first memory capacitor 121 and the second memory capacitor 122 is applied with a memory reference voltage 127 (Vm).

The memory reference voltage 127 (Vm) is different from the ground voltage of the other circuits. In the other side of the electrodes (opposing side to the memory reference voltage 127) of each of the first memory capacitor 121 and the second memory capacitor 122, the second selection switch 126 is connected. The other side of the electrodes (opposing side to the memory reference voltage 127) of the first memory capacitor 121 is also connected to the reset level selection switch 124. The other side of the electrodes (opposing side to the memory reference voltage 127) of the second memory capacitor 122 is also connected to the signal level selection switch 125.

A voltage level at the respective switch sides (reset level selection switch 124 side and the signal level selection switch 125 side) of the first memory capacitor 121 and the second memory capacitor 122 is closer to a voltage level at the power supply side than a voltage level at the ground side. The first memory capacitor 121 and the second memory capacitor 122, accordingly, are preferably an n channel MOS transistor (MOS capacitor).

The first selection switch 123, the reset level selection switch 124, and the signal level selection switch 125 operate when the first memory capacitor 121 and the second memory capacitor 122 store the charge. The reset level selection switch 124, the signal level selection switch 125, and the second selection switch 126 operate when the charge (voltage) accumulated in the first memory capacitor 121 or the second memory capacitor 122 is transferred to the second amplifier circuit 80.

More specifically, the first amplifier circuit 115 and one of the first memory capacitor 121 and the second memory capacitor 122 are connected via the first selection switch 123 and one of the reset level selection switch 124 and the signal level selection switch 125. The electric charge accumulated in the FD region 113 corresponds to an amount of one of the reset level and the signal level, according to when the transfer switch 112 and the reset switch 114 operate. The reset level or the signal level converted from the electric charge accumulated in the FD region 113 is transferred to the first memory capacitor 121 or the second memory capacitor 122 by controlling the operation of each switch.

Additionally, the operation of the second selection switch 126 selects the pixel 110, and transfers the above-mentioned reset level and signal level to the second amplifier circuit 80. The first memory capacitor 121 and the second memory capacitor 122 respectively transfer the reset level and the signal level to the second amplifier circuit 80 according to control of the operation of the second selection switch 126, the reset level selection switch 124, and the signal level selection switch 125. The first memory capacitor 121 and the second memory capacitor 122 each configure a charge accumulation section that accumulates the charge.

Referring again to FIG. 2, it can be seen that the pixel circuit 10 includes the first current source 140 and the second current source 150. The first current source 140 is a constant current source for the first amplifier 115 of each pixel 110 in the column. The second current source 150 is a constant current source for the second amplifier circuit 80. The current at each of the first current source 140 and the second current source 150 is variable.

The second amplifier circuit 80 is configured, for example, as a single n channel MOS transistor. The second amplifier circuit 80 amplifies a signal (voltage) output from each pixel 110 in the column and then outputs the signal (voltage) to the A-CDS circuit 20. The second amplifier circuit 80 less effects to a conversion gain than the first amplifier 115, even when having a large size. The second amplifier circuit 80 preferably has a larger size than that of the first amplifier 115 in order to improve noise characteristics (flicker noise, thermal noise, random telegraph signal (RTS) noise, etc.). A back gate of the second amplifier circuit 80 is preferably connected to a source in consideration of a back gate effect. The second amplifier circuit 80 may include a p channel MOS transistor.

Each of the selection switches (second selection switch, etc.), the first amplifier 115, and the second amplifier circuit 80 individually include a MOS transistor. Each of the above-mentioned circuits, that is, each of the selection switches, the first amplifier 115, and the second amplifier circuit 80, includes a single transistor, however, it may include a complementary MOS switch (CMOS-SW), which uses an n channel transistor and a p channel transistor, depending on, for example, an ON resistance and a charge injection of the transistors. Additionally, each of the above-mentioned circuits may include a p channel transistor depending on potential. For example, the potential of the first selection switch 123 is high when a reset voltage (Vrd) is high, and the ON resistance with a p channel transistor is lower than that with an n channel transistor.

Operation of CMOS Sensor 1

The operation of the CMOS sensor 1 will now be described with reference to FIG. 4 and FIG. 5.

Figure 4:
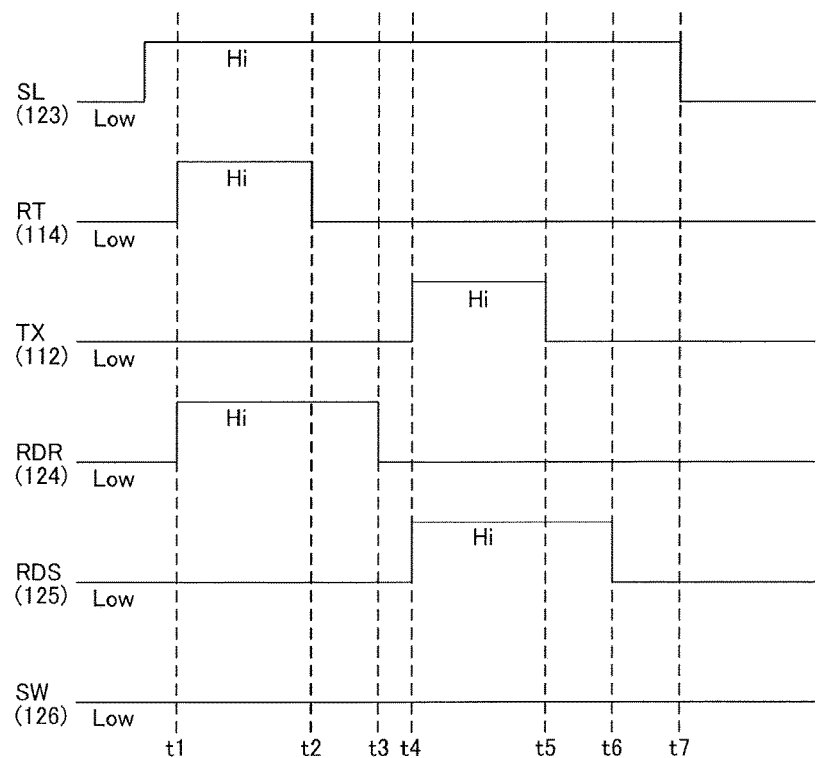
FIG. 4 is a timing chart illustrating when to write the pixel block of the solid-state image sensor according to the embodiment.

FIG. 4 illustrates a timing chart illustrating a time when to write the signal level and the reset level to the memory 120. FIG. 5 is a timing chart illustrating when to read the signal level and the reset level from the memory 120.

An arbitrary time is indicated by t1, t2, t3, or the like. In FIG. 4, an operating state (timing) of the first selection switch 123 is indicated by SL. In FIG. 4, an operating state (timing) of the reset switch 114 is indicated by RT. In FIG. 4, an operating state (timing) of the transfer switch 112 is indicated by TX. In FIG. 4, an operating state (timing) of the reset level selection switch 124 is indicated by RDR. In FIG. 4, an operating state (timing) of the signal level selection switch 125 is indicated by RDS. In FIG. 4, an operating state (timing) of the second selection switch 126 is indicated by SW. In FIG. 4, lines in a horizontal direction individually indicate an operation timing (operating state) of each switch. When one of the switches is in an ON state, this means the switch closes contacts. In other words, each switch operates when the switch is in an ON state.

As described in FIG. 4, the reset switch 114 operates and closes contacts at a time t1 (RT is ON). This causes a reset voltage (Vrd) to be applied to the FD region 113, and the FD region 113 turns in a reset state with the reset voltage (Vrd). The reset level selection switch 124 also operates and closes contacts at the time t1 (RDR is ON). Before the time t1, the first selection switch 123 closes contacts so that writing the reset level into the first memory capacitor 121 starts at the time t1.

Subsequently, the reset switch 114 operates and opens contacts at a time t2 (RT is OFF). This stops applying the reset voltage (Vrd) to the FD region 113. At a time t3, the reset level selection switch 124 operates and opens the contacts (RDR is OFF). This stops writing the reset level into the first memory capacitor 121. The first memory capacitor 121, namely, stores the reset level at the time t3.

Subsequently, the transfer switch 112 operates and closes contacts at a time t4 (TX is ON). This causes the charge generated by the light receiving element 111 to be transferred to the FD region 113. The signal level selection switch 125 also operates and closes contacts at the time t4 (RDS is ON). This starts writing the signal level from the FD region 113 to the second memory capacitor 122 via the first amplifier 115.

Subsequently, the transfer switch 112 operates and opens the contacts at a time t5 (TX is OFF). This stops transferring the charge, which is generated by the light receiving element 111, to the FD region 113. The signal level selection switch 125 then operates and opens contacts at a time t6 (RDS is OFF). This stops writing the signal level into the second memory capacitor 122. The second memory capacitor 122, accordingly, stores the signal level at the time t6.

Figure 5:
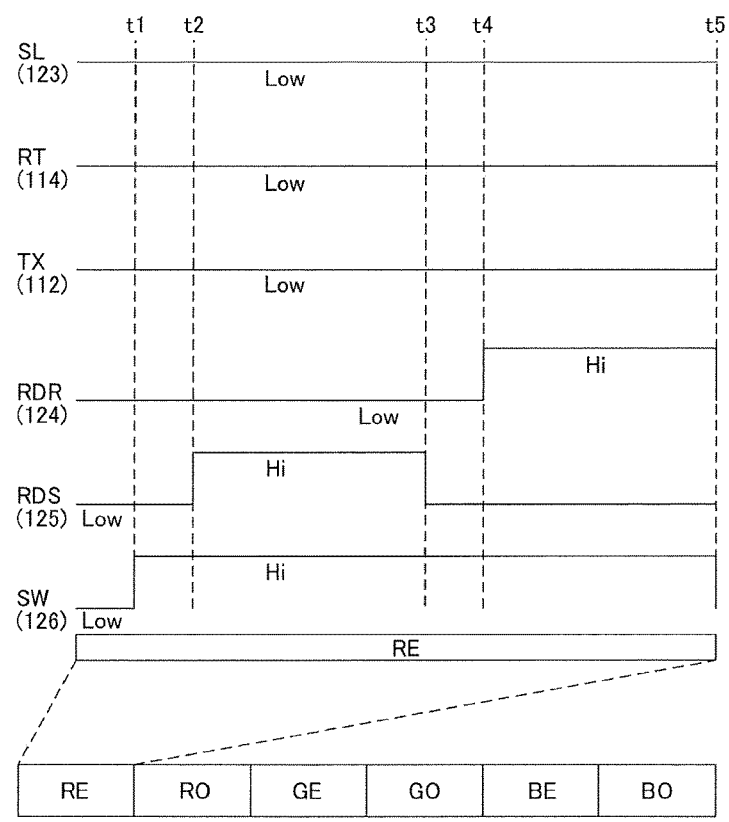
FIG. 5 is a timing chart illustrating when to read the pixel block of the solid-state image sensor according to the embodiment.

Each code in FIG. 5, such as SL, RT, or the like, indicates the same switch as indicated in FIG. 4. An arbitrary time is indicated by t1, t2, t3, or the like. The CMOS sensor 1 related to the operation illustrated in FIG. 5 is assumed to include six pixels 110 and six memories 120 in each pixel block 100 in a column.

As already described above, the CMOS sensor 1 sequentially reads the six pixel blocks 100. Reading individual operations of the six pixel blocks 100 are the same. The R pixel block $100_{RE}$ will be used in the following explanation for when to read the signals as a representative of pixel blocks 100.

As described in FIG. 5, the second selection switch 126, which selects one (here, R pixel block $100_{RE}$) of the pixel blocks 100, operates and closes contacts at a time t1 (SW is ON). In the description here, the second selection switch 126 of the R pixel block $100_{RE}$ operates.

Subsequently, the signal level selection switch 125 of the R pixel block $100_{RE}$ operates and closes the contacts at a time t2 (RDS is ON). This starts reading the signal level stored in the second memory capacitor 122. The read signal level is output to the A-CDS circuit 20, which is in the post-stage, via the second amplifier circuit 80.

Subsequently, the signal level selection switch 125 of the R pixel block $100_{RE}$ operates and opens the contacts at a time t3 (RDS is OFF). This stops reading the signal level from the second memory capacitor 122.

The reset level selection switch 124 then operates and closes the contacts at a time t4 (RDR is ON). This starts reading the reset level stored in the second memory capacitor 122. The read reset level is output to the A-CDS circuit 20, which is in the post-stage, via the second amplifier circuit 80. Subsequently, the reset level selection switch 124 of the R pixel block $100_{RE}$ operates and opens the contacts at a time t5 (RDS is OFF). The second selection switch 126 of the R pixel block $100_{RE}$ also operates and opens the contacts at the time t5 (SW is OFF). This stops reading the signal level and the reset level in the R pixel block $100_{RE}$. After that and at a next timing, the reading operation continues with the R pixel block $100_{RO}$ where the reading operation is performed in the same way with that in the R pixel block $100_{RE}$.

The operation as described above is performed sequentially for each of the plurality of the pixel blocks 100 included in the CMOS sensor 1. Through this operation, the signal level and the reset level are read out from the pixel blocks 100 sequentially. The signal processing circuit 40, which is disposed in the post-stage of the pixel circuit 10, calculates and removes the difference component between the signal level and the reset level and generates and outputs a signal (image signal), accordingly.

In a case where individual offset values of the pixel blocks 100 are different, for example, individual operations of the first amplifiers 115 are different so much each other, fixed pattern noise in a vertical stripe appears in an image formed based on signals output from each first amplifier 115. The offset value, however, can be canceled by removing the difference value between the signal level and the reset level from the pixel block 100 as described above. This processing is referred to as a correlated double sampling processing.

Additionally, a kTC noise (reset noise) caused by turning on the reset switch 114 is correlated with the reset level and the signal level. That is, the CMOS sensor 1 also can cancel the reset noise by performing the correlated double sampling processing.

Configuration of A-CDS Circuit

Figure 6:
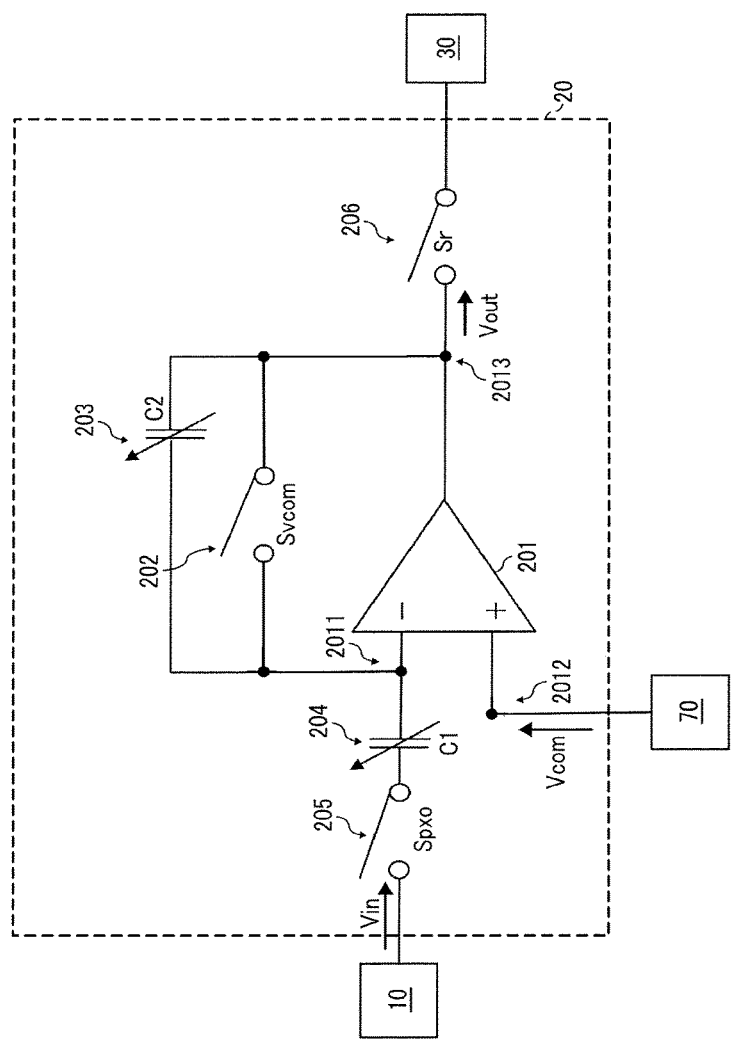
FIG. 6 is a circuit diagram illustrating a configuration of an analog CDS circuit of the solid-state image sensor according to the embodiment.

FIG. 6 is a circuit diagram illustrating the configuration of the A-CDS circuit 20. As described in FIG. 6, the A-CDS circuit 20 includes an amplifier 201, a feedback switch 202, a feedback capacitor 203, an input capacitor 204, an input switch 205, and an output switch 206.

The amplifier 201 is an inverting amplifier that includes a first input terminal 2011 that is an inverting input terminal, a second input terminal 2012 that is a non-inverting input terminal, and an output terminal 2013. The first input terminal 2011 connects to the pixel circuit 10 via the input switch 205. The second input terminal 2012 connects to the reference voltage generating circuit 70. The output terminal 2013 is connected to the ADC circuit 30 via the output switch 206.

One of the signal level and the reset level is input into the amplifier 201 at the inverting input terminal (first input terminal 2011) and a clamp reference voltage (Vcom) is input into the amplifier 201 at the non-inverting input terminal (the second input terminal 2012). The output terminal 2013 outputs a difference between these inputs.

The feedback switch 202 is disposed between the output terminal 2013 and the first input terminal 2011, and performing switching of a feedback circuit. When the feedback switch 202 turns on (closes contacts), the output terminal 2013 and the first input terminal 2011 are electrically conducted and feedback is active on the amplifier 201. At that time, an output level (Vout) of the output terminal 2013 is equal to the clamp reference voltage (Vcom) that is an input level of the second input terminal 2012.

The feedback capacitor 203 is disposed between the output terminal 2013 and the first input terminal 2011. The feedback switch 202 mentioned above is disposed in parallel with a loop capacitor. The feedback capacitor 203 is a first electrostatic capacitor having first electrostatic capacitance (C2) that stabilizes the output level (Vout) of the amplifier 201 when the feedback switch 202 is in an off state.

The input capacitor 204 is disposed between the first input terminal 2011 and the input switch 205. The input capacitor 204 is a second electrostatic capacitor having second electrostatic capacitance (C1) that is used to determine an amplification factor in the A-CDS circuit 20. The determination is based on a rate between capacitance of the input capacitor 204 and capacitance of the feedback capacitor 203. The ratio between electrostatic capacitance C1 of the input capacitor 204 to the electrostatic capacitance C2 of the feedback capacitor 203 (C1/C2) is equal to the amplification factor in the A-CDS circuit 20.

The input switch 205 fixes a level at the inverting input terminal side of the amplifier 201 when nothing is input from the pixel circuit 10, namely neither signal level nor the reset level is input. The A-CDS circuit 20 can operate without having the input switch 205. The input switch 205, accordingly, may be disposed in the pixel circuit 10, instead of the A-CDS circuit 20.

The output switch 206 switches a conductive state of the amplifier 201 and the ADC circuit 30. When the output switch 206 is in an on state (closes contacts), the A-CDS circuit 20 is electrically conducted with the ADC circuit 30. The output switch 206 may be disposed in the ADC circuit 30 instead of the A-CDS circuit 20.

Operation of A-CDS Circuit 20

Figure 7:
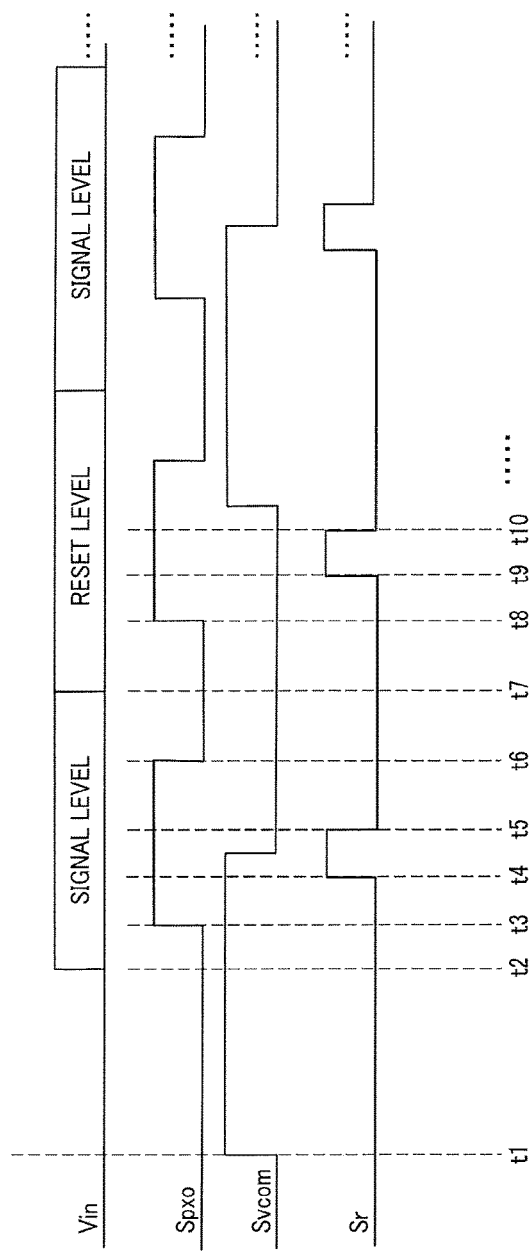
FIG. 7 is a timing chart illustrating an operating state of the analog CDS circuit of the solid-state image sensor according to the embodiment.

FIG. 7 is a timing chart illustrating the operation of the A-CDS circuit 20. In FIG. 7, an arbitrary time is indicated by t1, t2, t3, or the like.

In FIG. 7, a level of input signal of the first input terminal 2011 is indicate by "Vin". When Vin indicates a high level, this means that one of the reset level and the signal level is input from the pixel circuit 10. In FIG. 7, an operating state (timing) of the input switch 205 is indicated by "Spxo". When Spxo indicates a high level, this means that the pixel circuit 10 and the first input terminal 2011 of the amplifier 201 are electrically conducted via the input switch 205. With this state, one of the signal level and the reset level is input to the first input terminal 2011. In FIG. 7, an operating state (timing) of the feedback switch 202 is indicated by "Svcom". When Svcom indicates a high level, this means that the output terminal 2013 and the first input terminal 2011 are electrically conducted via the feedback switch 202, and an output level (Vout) is input to the first input terminal 2011.

In FIG. 7, an operating state (timing) of the output switch 206 is indicated by "Sr". When Sr indicates a high level, this means that the output terminal 2013 and the ADC circuit 30 are electrically connected via the output switch 206.

As illustrated in FIG. 7, the feedback switch 202 operates to close contacts at a time t1 (Svcom is ON). In this state, the output level (Vout) of the output terminal 2013 is equal to the clamp reference voltage (Vcom) input to the second input terminal 2012 from the reference voltage generating circuit 70.

Subsequently, the signal level is input from corresponding one of the pixel blocks 100 of the pixel circuit 10 at a time t2. At this time, Spxo remains in an off state so that the input switch 205 opens contacts. That is, no signal level is input to the first input terminal 2011 of the amplifier 201 at the time t2, so that the output level (Vout) remains to be the clamp reference voltage (Vcom).

Subsequently, the input switch 205 operates to close the contacts at a time t3 (Spxo is ON). In this state, the signal level is input to the first input terminal 2011 of the amplifier 201 from the pixel circuit 10, and charges from the signal level are accumulated in the input capacitor 204. An amount of charges Q1 that are accumulated in the input capacitor 204 is calculated with the following equation (1). Here, the electrostatic capacitance of the input capacitor 204 is presented by "C1", and the signal level is presented by "Vs". During the on state of Spxo, the signal level from the pixel circuit 10 is clamped to a level of the clamp reference voltage (Vcom) and then output from the amplifier 201.

$$Q1 = C1 * (Vcom - Vs) \quad \text{Equation (1)}$$

Subsequently, the output switch 206 operates to close contacts at a time t4 (Sr is ON). When Sr is ON, the output switch 206 is conducted and the output level (Vout) of the amplifier 201 is input to the ADC circuit 30, and the ADC circuit 30 starts sampling. Additionally, when the output switch 206 is conducted, a load from the ADC circuit 30 is applied to the output of the amplifier 201.

In the A-CDS circuit 20, after the amplifier 201 is connected to the ADC circuit 30 and the load is applied to the output of the amplifier 201 from the ADC circuit 30, the feedback switch 202 operates to open contacts (Svcom is OFF).
This stabilizes a clamp level. At this time when Svcom becomes an off state, the ADC circuit ends sampling.

When Svcom becomes the off state in a period between the time t4 and a time t5, an output level (Vout) of the amplifier 201 becomes equal to the clamp reference voltage (Vcom). The output level (Vout) is represented by the following equation, which is an equation (2). Vout at this time has the same level with the clamp reference voltage (Vcom) as illustrated in the equation (2).

$$Vout = Vcom \quad \text{Equation (2)}$$

Subsequently, the output switch 206 operates to close the contacts at the time t5 (Sr is OFF). At this time, the ADC circuit 30 starts analog-digital (AD) conversion of the sampled signal level.

As described above, the feedback switch 202 operates and Svcom turns off in the period between the time t4 and the time t5, and then output switch 206 turns off. In short, Sr turns on and then Svcom turns off, and after that, Sr turns off. This timing, which Sr turns off, is when to start the digital conversion in the ADC circuit 30.

The output switch 206 operates to close the contacts so that the amplifier 201 and the ADC circuit 30 are electrically conducted, and then the feedback switch 202 operates to open the contacts. After that, the output switch 206 operates to open the contacts. With this operation sequence, the feedback switch 202 opens the contacts to release a feedback state under condition that a large amount of load is applied to the output level (Vout) of the amplifier 201 from the ADC circuit 30. This stabilizes the clamp level more. Regarding the on and off operation of Svcom and Sr, Sr may turns on or off after Svcom turns off, namely, the feedback switch 202 opens the contacts.

Subsequently, the input switch 205 operates to open contacts at a time t6 (Spxo is OFF). This operation defines an amount of electric charges accumulated in the input capacitor 204 and the feedback capacitor 203, individually.

Subsequently, the input to the A-CDS circuit 20 changes from the signal level to the reset level at a time t7. At this time, Spxo is OFF so that the signal level is not input to the amplifier 201. The amounts of electric charges of the input capacitor 204 and the feedback capacitor 203 do not change, accordingly. In FIG. 7, the input from the pixel circuit 10 to the A-CDS circuit 20 switches from the signal level to the reset level continuously. Alternatively, intermediate potential, which is different from the signal level and the reset level, may be input between the signal level and the reset level.

Subsequently, the input switch 205 operates to close the contacts at a time t8 (Spxo is ON). With this state, the reset level is input to the first input terminal 2011 of the amplifier 201 from the pixel block 100 of the pixel circuit 10.

At that time, the feedback switch 202 opens the contacts (Svcom is OFF), so that a total amount of charges accumulated in the feedback capacitor 203 and the input capacitor 204 (a total amount of charge in the inverting input terminal side of the amplifier 201) remains.

That is, under the condition where the reset level is input to the first input terminal 2011, a voltage at a input switch 205 side in the input capacitor 204 changes from the signal level to the reset level. On the other hand, a voltage at a first input terminal 2011 side in the input capacitor 204 corresponds to the total amount of charges accumulated due to the signal level.

Here, a voltage of the signal level is indicated by Vs, a voltage of the reset level is indicated by Vr, the electrostatic capacitance of the input capacitor 204 is indicated by C1, and the electrostatic capacitance of the feedback capacitor 203 is indicated by C2. In this state, an amount of charges ((Vr−Vs)*C1) corresponding to a difference between Vs and Vr moves to a feedback capacitor 203 side. An output level (Vout) of the amplifier 201 at that time is presented by the following equation, which is an equation (3). Additionally, a state where the output level (Vout) can be presented by the equation (3) is referred to as an A-CDS state.

$$Vout = Vcom - (Vr - Vs) * C1 / C2 \quad \text{Equation (3)}$$

As described above, the output level (Vout) of the A-CDS circuit 20 is variable as long as the amount of charge accumulated in the input capacitor 204 and the feedback capacitor 203 is variable. The output level (Vout) in the A-CDS state can be freely changed with an amplification factor that is a rate of C1 to C2.

By calculating a difference between the output level (Vout) obtained with the equation (2) and the output level (Vout) obtained with the equation (3), a difference between the signal level and the reset level can be obtained. The difference then can be amplified using the rate of the input capacitor 204 to the feedback capacitor 203 (C1/C2).

That is, the A-CDS circuit 20 can amplify the difference between the signal level and the reset level. The embodiment is not limited to this, and the amplification may be performed in the ADC circuit 30 in consideration of a circuit area and difficulty of design. When the ADC circuit 30 performs the amplification, the operation may include changing a level of a reference voltage for ADC.

Subsequently, the output switch 206 operates to close the contacts at a time t9 (Sr is ON). At this time, the ADC circuit 30 starts sampling of the output level (Vout). The output switch 206 then operates to open the contacts at a time t10 (Sr is OFF). At this time, the ADC circuit 30 ends sampling of the output level (Vout) and the ADC circuits starts the AD conversion.

Figure 8:
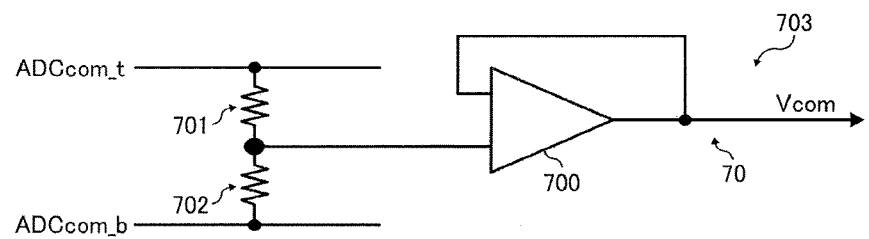
FIG. 8 is a circuit diagram illustrating a configuration of a reference voltage generating circuit of the solid-state image sensor according to the embodiment.

As for a method of generating a clamp reference voltage (Vcom): A level of the clamp reference voltage (Vcom) may be the same as a level of the reference voltage for ADC. The level of the clamp reference voltage (Vcom), which may be the same as the level of the reference voltage for ADC, is preferably between a level of top reference voltage for digital conversion (ADCcom_t) and a level of bottom reference voltage (ADCcom_b), considering that the level of the clamp reference voltage (Vcom) may exceed a range of the digital conversion in the ADC circuit 30 due to noise, offset or the like. Additionally, a relative difference between, a difference between the clamp reference voltage (Vcom) and the top reference voltage (ADCcom_t), and a difference between the clamp reference voltage (Vcom) and the bottom reference voltage (ADCcom_b) is preferably small, so that dynamic range in the ADC circuit 30 is large. In view of this, the reference voltage generating circuit 70 has a configuration as illustrated in FIG. 8. That is, the reference voltage generating circuit 70 of FIG. 8 generates the clamp reference voltage (Vcom) based on the top reference voltage (ADCcom_t) and the bottom reference voltage (ADCcom_b).

FIG. 8 is a circuit diagram illustrating an exemplary circuit that generates a clamp reference voltage, which is included in the reference voltage generating circuit 70. The reference voltage generating circuit 70 includes a reference voltage amplifier 700, first resistance 701 and second resistance 702 that are connected to a non-inverting input terminal of the reference voltage amplifier 700, and feedback wiring 703 that connects an output terminal to an inverting input terminal of the reference voltage amplifier 700.

The reference voltage generating circuit 70 divides the top reference voltage (ADCcom_t) and the bottom reference voltage (ADCcom_b) using the first resistance 701 and the second resistance 702. The divided voltage is input to the non-inverting input terminal of the reference voltage amplifier 700. An output of reference voltage amplifier 700 is input to the inverting input terminal of reference voltage amplifier 700. That is, feedback of the output of the reference voltage amplifier 700 is active so that the reference voltage generating circuit 70 outputs a voltage input from the non-inverting input terminal. Through this, the reference voltage generating circuit 70 can generate the clamp reference voltage (Vcom) that has little difference between the top reference voltage (ADCcom_t) and the bottom reference voltage (ADCcom_b).

Second Embodiment of Solid-State Image Sensor

Figure 9:
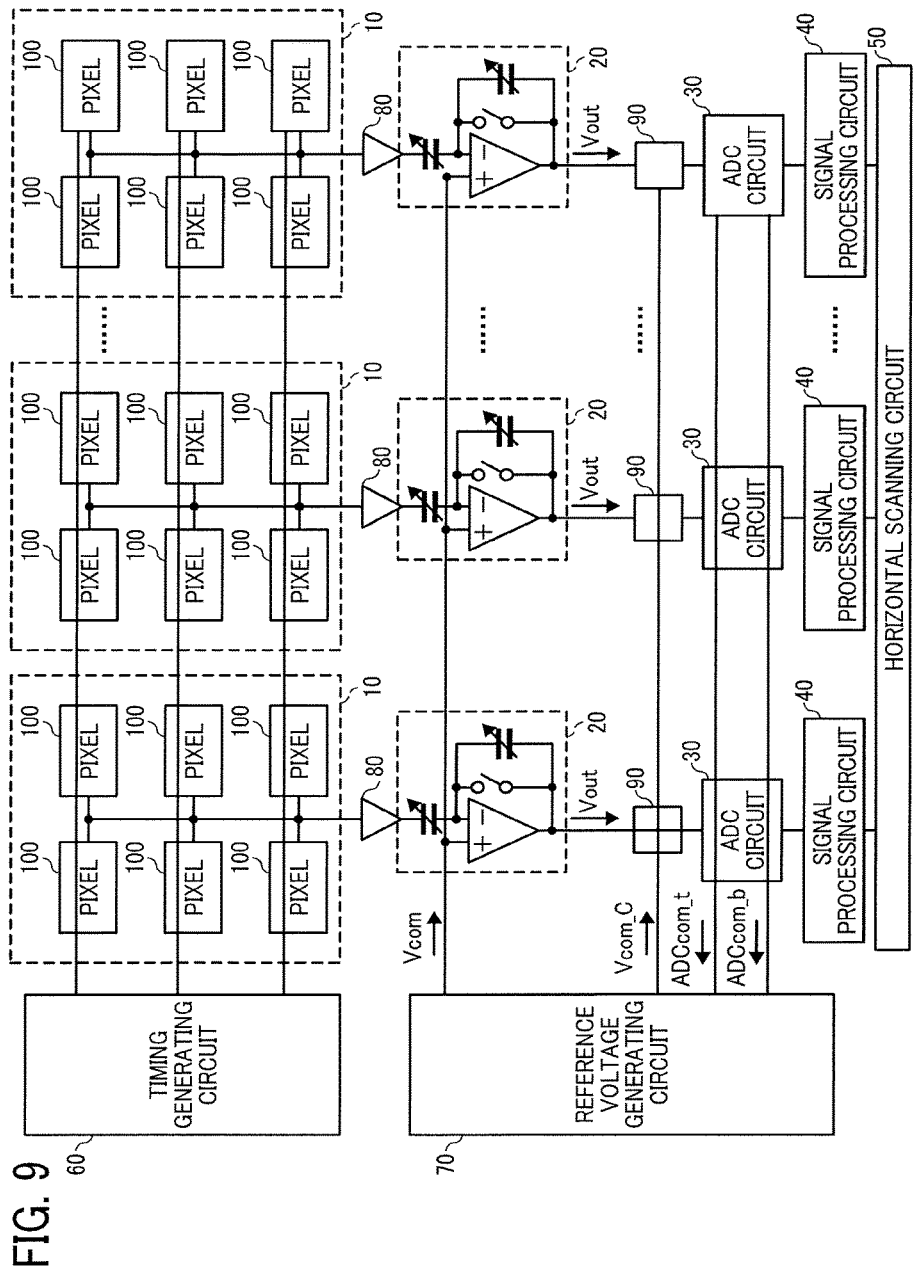
FIG. 9 is a block diagram illustrating exemplary configuration of a solid-state image sensor according to another embodiment.

Next, a solid-state image sensor according to another embodiment will be described. A CMOS sensor 2, which is the solid-state image sensor according to the second embodiment, includes a clip circuit 90 as described in FIG. 9. The CMOS sensor 2 has a configuration similar to that of the CMOS sensor 1 described above. In the description regarding the CMOS sensor 2, the same reference numerals with that of the CMOS sensor 1 will be assigned with the same or like elements throughout the drawings and detailed description of the same or like elements will be omitted.

Figure 19:
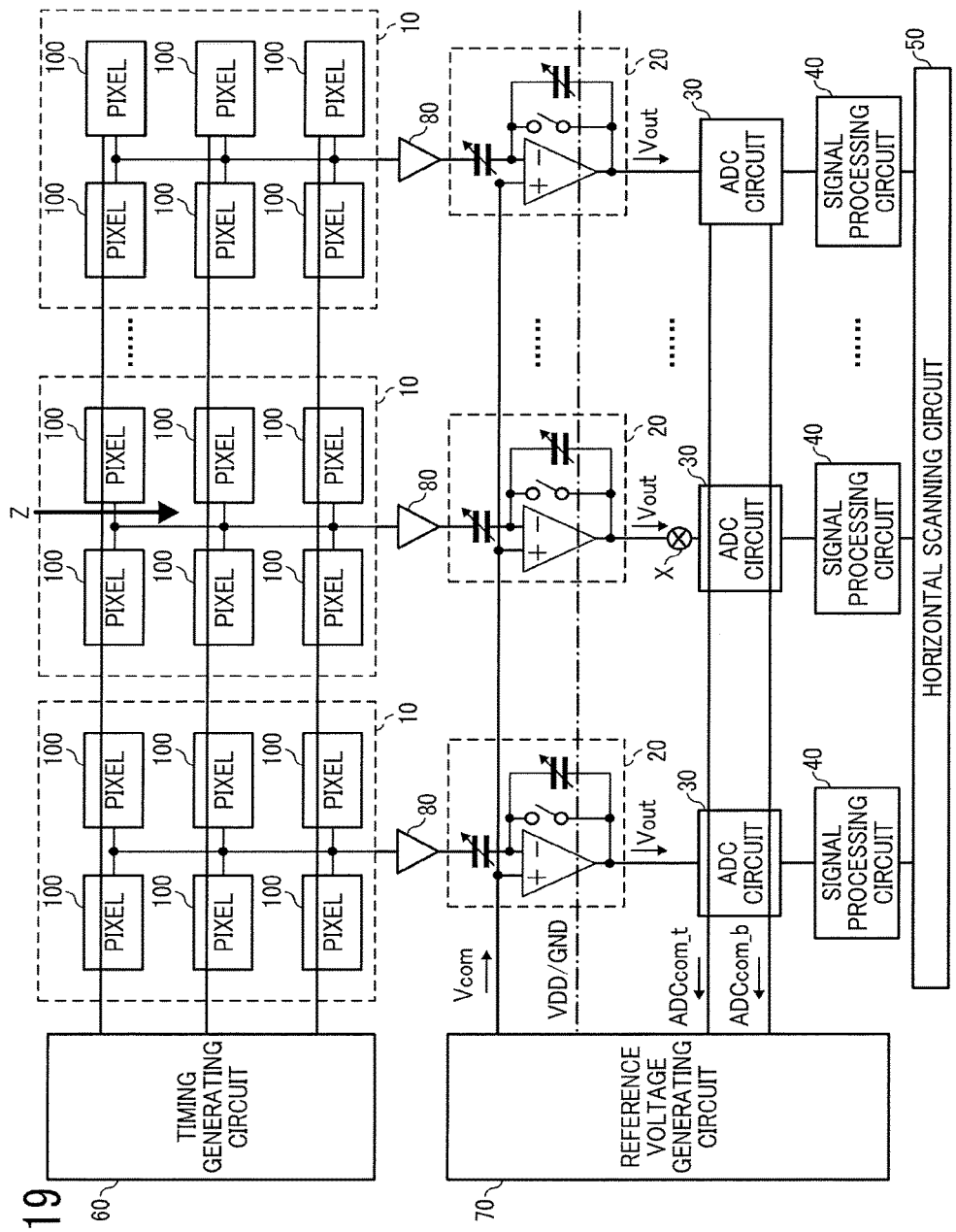
FIG. 19 is a block diagram illustrating the solid-state image sensor in a state where a strong light enters only a part of the pixel circuit of the solid-state image sensor according to the embodiment.
Figure 20:
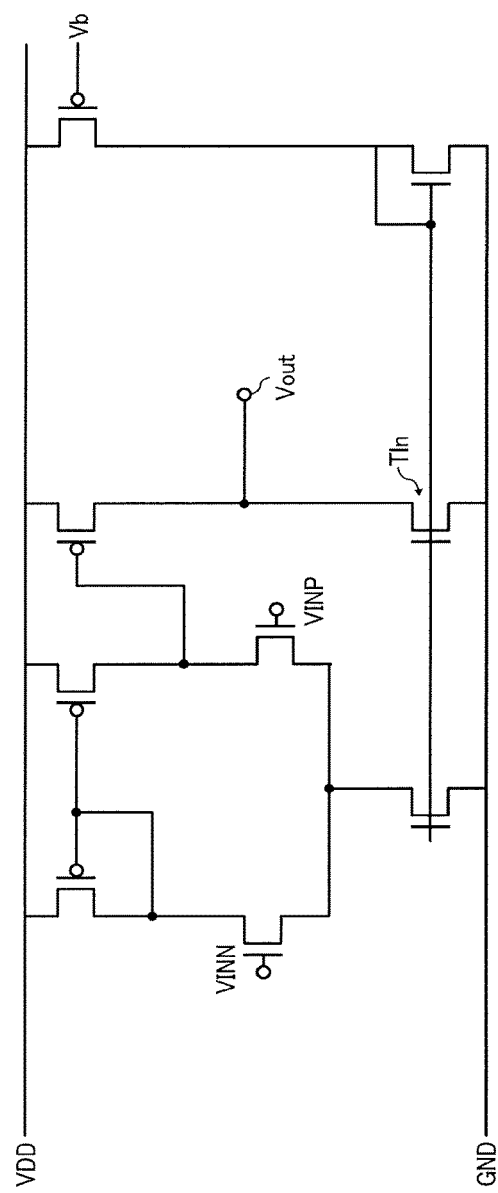
FIG. 20 is a circuit diagram illustrating an exemplary configuration of an amplifier included in the A-CDS circuit according to one of the embodiments.
Figure 21:
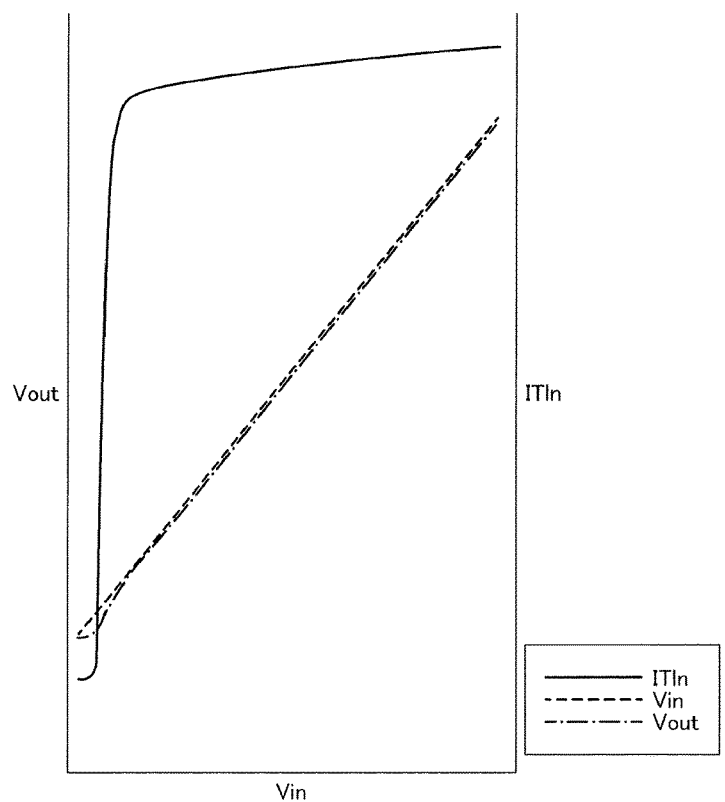
FIG. 21 is a graph illustrating an effect of the light incident to the part of the pixel circuit of the solid-state image sensor according to the embodiments.

Before describing regarding the CMOS sensor 2, an event that occurs when a strong light enters a part of columns in the CMOS sensor 1, which is described above, will now be explained with reference to FIGS. 19 to 21. FIG. 19 is a block diagram illustrating the CMOS sensor 1 in a state where a strong light enters only a part (column Z) of the columns. FIG. 20 is a circuit diagram illustrating an exemplary configuration of an amplifier 201 used in the A-CDS circuit 20 included in the CMOS sensor 1 illustrated in FIG. 19. FIG. 21 is a graph illustrating a relationship among input (Vin), output (Vout), and a current flowing through a transistor T1n in the amplifier 201 illustrated in FIG. 20.

As described in FIG. 19, the amplifier 201 included in the A-CDS circuit 20 in the column Z shares a power source VDD and ground GND with the other A-CDS circuits 20, the other ADC circuits 30, the other pixel blocks 100, and the like in other columns. In the amplifier 201 of FIG. 19, the transistor T1n operates to generate an output (Vout) based on an input of the inverting input terminal (Vin) and an input of the non-inverting input terminal (e.g. clamp reference voltage (Vcom)).

As described in FIG. 19, when the strong light enters only the column Z, an output (Vout) of the amplifier 201 included in the A-CDS circuit 20 in the column Z, or, an output level of the amplifier 201 at a node X significantly drops. That is, a drain-source voltage Vds of the transistor T1n of the amplifier 201 of the A-CDS circuit 20 in association with the node X, accordingly, becomes small, and the transistor T1n, which is a load current source, enters an unsaturated region, as described in FIG. 21. This causes the transistor T1n to stop a flow of the current. This decreases the current consumed with the amplifier 201, and changes an amount of current flowing to the power source VDD and the ground GND. As a result, an IR drop of the power source VDD and the ground GND due to parasitic resistance also changes.

The power source VDD and the ground GND are also used and shared by the other circuits, so that an IR drop in each of the other circuits also changes. That is, the IR drops in the A-CDS circuits 20 in the other columns than the column Z also change.

In one of the columns that is not the column Z, but placed around the column Z, when the reset level is input to the A-CDS circuit 20 after the A-CDS circuit 20 outputs an output (Vout) that is the same level with a clamp reference voltage (Vcom), an event as described below occurs.

In short, when the strong light enters only the column Z by a time when the level that is clamped and amplified (see the equation (3) above) is output, offsets in the column Z and the other columns change. When the offset changes, signal processing accuracy decreases even when the signal processing circuit 40, which is connected in the post stage of the A-CDS circuit 20, calculates the difference with high accuracy.

That is, the strong light incident to the column Z influences on the signal processing circuit 40 in the column Z and the other signal processing circuits 40 in the other columns. Such influence causes low accuracy of the image signal output of the CMOS sensor 1.

Referring again to FIG. 9, the CMOS sensor 2 includes the clip circuit 90 in the post stage of the A-CDS circuit 20 as described above. By including the clip circuit 90, the A-CDS circuit 20 maintains a level of output (Vout) above a certain value. Decrease in the level of the output (Vout) of the A-CDS circuit 20 due to the strong light incident to the part of the columns is limited, namely, this decrease stops at the certain value, so that the Vds of the transistor T1n included in the amplifier 201 is hold.

Figure 10:
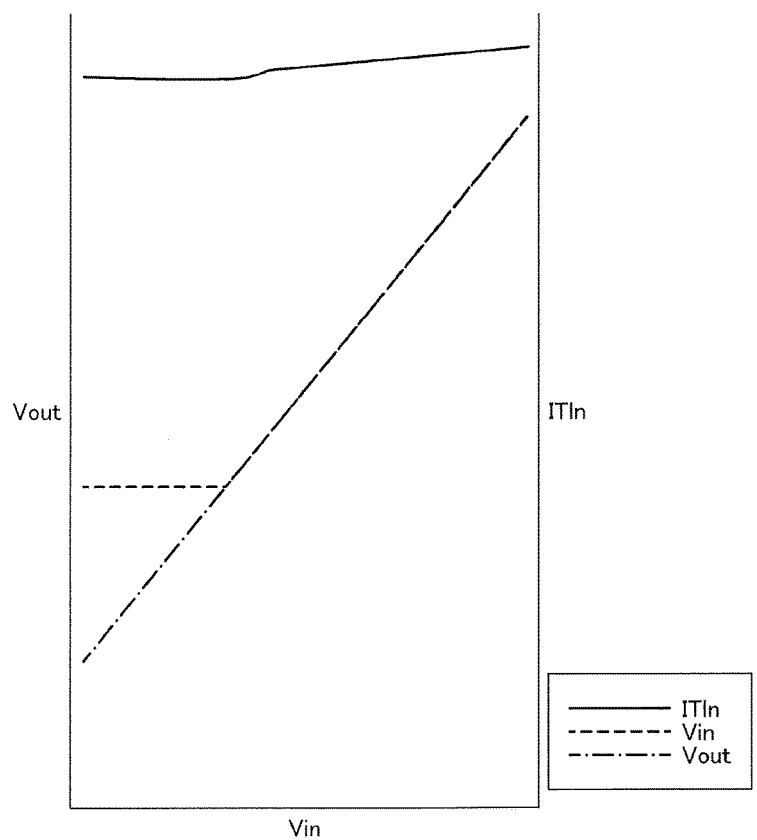
FIG. 10 is a graph illustrating a relationship between input and output of the analog CDS circuit of the solid-state image sensor according to the embodiment.

FIG. 10 is another graph illustrating a relationship among the input (Vin), the output (Vout), and the current (It1n) flowing through a transistor T1n in the amplifier 201 included in the A-CDS circuit 20. As described in FIG. 10, the current flowing in the transistor T1n does not enter the unsaturated region as long as the output (Vout) of the amplifier 201 is maintained above the certain level. This prevents a large change of offset occurred due to the IR drop, as described above. This, accordingly, achieves high accuracy image signal output.

A clip level of the clip circuit 90 included in the CMOS sensor 2 is preferably a level with which the transistor T1n included in the A-CDS circuit 20 can usually operates in a saturated region.

Additionally, the dynamic range in the ADC circuit 30 cannot be effectively used when the clip level is in a range between a top reference voltage (ADCcom_t) and a bottom reference voltage (ADCcom_b). The clip level, accordingly, is preferably out of the range between the top reference voltage (ADCcom_t) and the bottom reference voltage (ADCcom_b).

In addition to that, a value of the clip reference voltage to define the clip level preferably varies.

Referring again to FIG. 9, it can be seen that the CMOS sensor 2 includes the clip circuits 90 in the post stage of the A-CDS circuits 20 so as to each clip circuit 90 corresponds to each A-CDS circuit 20. The clip circuit 90 determines the clip level using the clip reference voltage (Vcom_C) that is provided from the reference voltage generating circuit 70. The clip reference voltage (Vcom_C) is used in common by all of the clipping circuits 90. This prevents increase of a layout area in the CMOS sensor 2.

When the IR drop is large, a circuit that supplies the clip reference voltage (Vcom_C) may be used for each certain area that has a possibility to be affected by the IR drop. For example, a supply circuit for the clip reference voltage (Vcom_C) may be provided for each 1000 pixel circuits 10, when the CMOS sensor 2 has 2000 pixel circuits 10.

Figure 11:
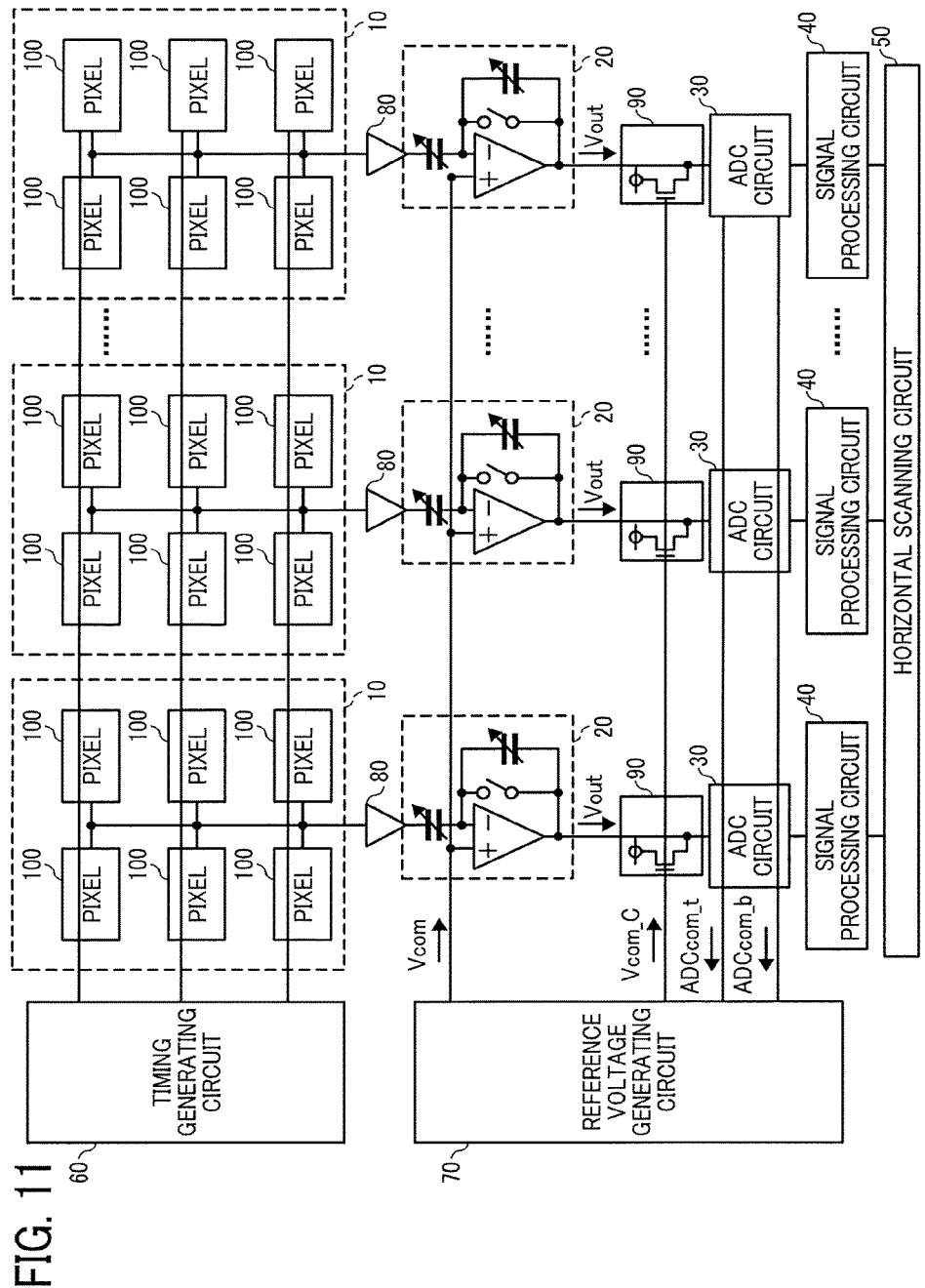
FIG. 11 is a block diagram illustrating an exemplary configuration of a solid-state image sensor according to still another embodiment.

The clip circuit 90 may include, for example, a single transistor. FIG. 11 is a block diagram illustrating an exemplary configuration of the CMOS sensor 2 in which the clip circuit 90 includes a single transistor. In FIG. 11, the transistor includes an n channel transistor, but may include a p channel transistor, instead of the n channel transistor. The clip circuits 90 uses the clip reference voltage (Vcom_C) in common, so that increase in a layout area is prevented.

Figure 12:
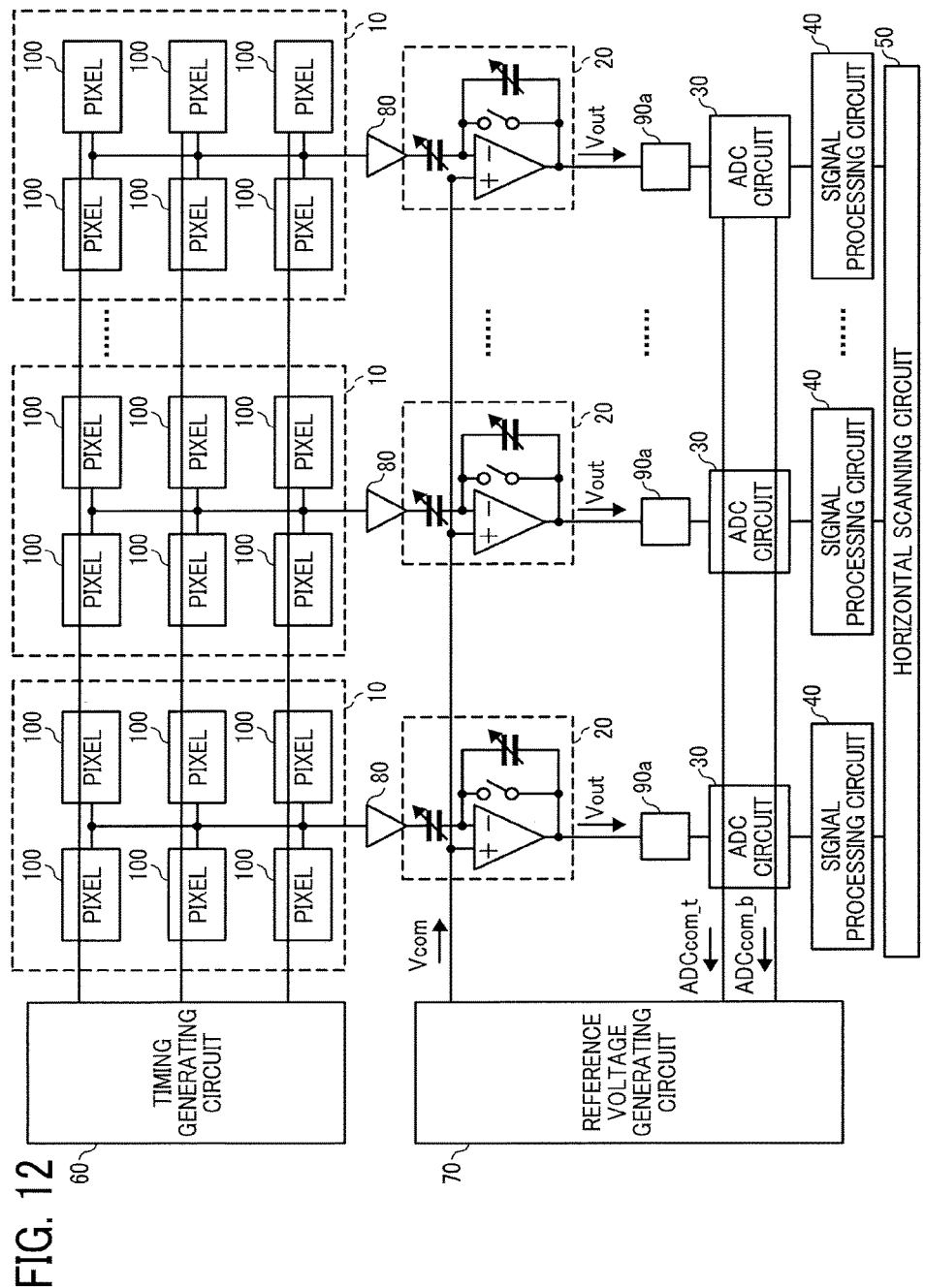
FIG. 12 is a block diagram illustrating an exemplary configuration of a solid-state image sensor according to still another embodiment.

The clip circuit 90 may generate the clip reference voltage (Vcom_C) in the clip circuit 90, instead of using the reference voltage generating circuit 70. FIG. 12 is a block diagram illustrating an exemplary configuration of the CMOS sensor 2 in which the clip circuit 90a generates the clip reference voltage (Vcom_C) by itself.

Figure 13:
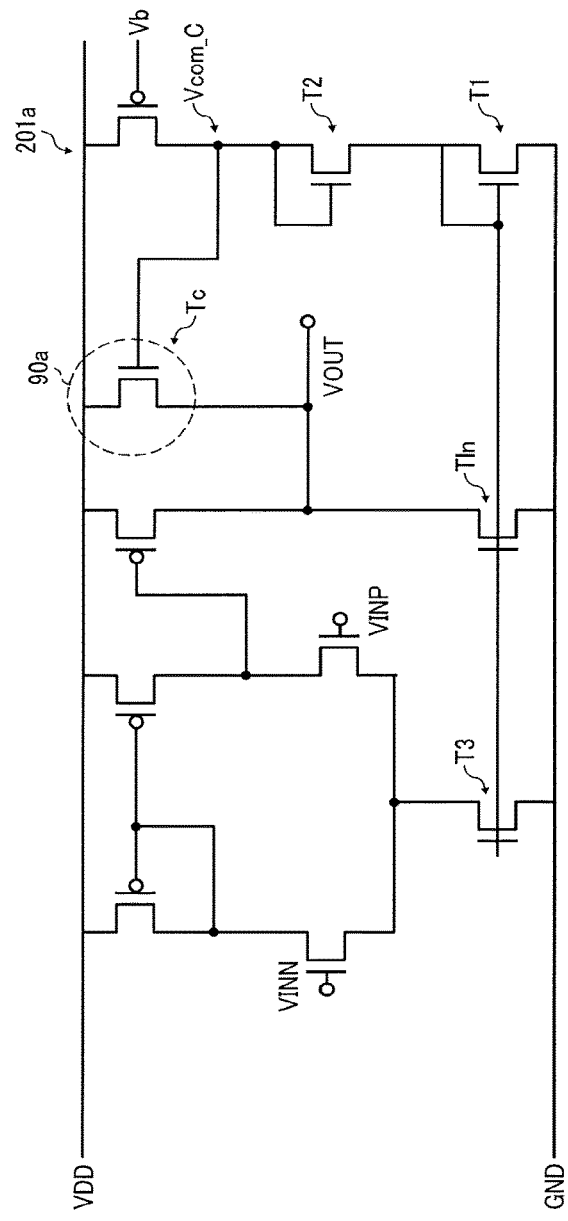
FIG. 13 is a block diagram illustrating a configuration of a clip circuit of the solid-state image sensor according to the still another embodiment.

FIG. 13 is a circuit diagram illustrating a configuration of the clip circuit 90a. In FIG. 13, the clip circuit 90a generates the clip reference voltage (Vcom_C) using an amplifier 201a included in the A-CDS circuit 20. The clip circuit 90a simply includes a transistor Tc.

The transistor Tc may use either one of the n channel transistor and the p channel transistor. A source of the transistor Tc may be connected to either one of the output of the A-CDS circuit 20 and the output of the ADC circuit 30. A drain of the transistor Tc may be connected to either one of the power source VDD and the ground GND. A gate of the transistor Tc is connected to the clip reference voltage (Vcom_C). In the CMOS sensor including the clip circuit 90a, a gate-source voltage (Vgs) of the transistor T1n in the amplifier 201a changes according to an amount of current. In conjunction with this, the clip reference voltage (Vcom_C) varies based on a transistors T1 and T2. That is, a level of the clip reference voltage (Vcom_C) changes according to the amount of current in the amplifier 201a, so that a suitable clip level can be usually set. This increases resistance to variation of levels among the columns.

With the configuration of the clip circuit 90a as illustrated in FIG. 13, Vgs of the transistor T1n varies according to the amount of current. According to the change of Vgs of the transistor T1n, the clip reference voltage (Vcom_C) also changes and a suitable clipping level can be usually set.

In the examples described above, a circuit having a clip function is included in the post-stage of the A-CDS circuit 20 or inside of the A-CDS circuit 20, however, the clip circuit 90 included in the CMOS sensor 2 is not limited to these. For example, such a circuit having the clip function may be provided in the post-stage of the ADC circuit 30 or inside of the ADC circuit 30.

Variable Capacitance

Another exemplary configuration of the A-CDS circuit 20 according to the embodiment will be described with reference to the drawings. The A-CDS circuit 20 described above amplifies a difference level with the rate of the input capacitor 204 (C1) to the feedback capacitor 203 (C2). That is, the A-CDS circuit 20 described above can set an arbitrary amplification factor by varying the rate of C1 to C2.

Figure 14:
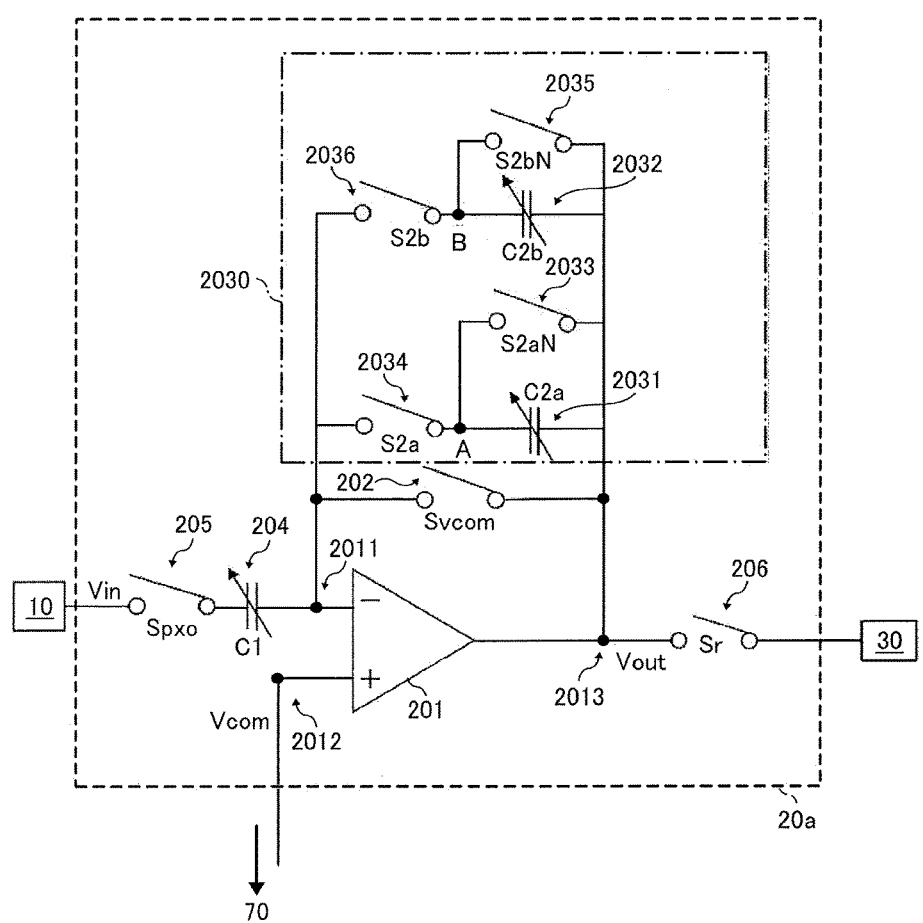
FIG. 14 is a circuit diagram illustrating an A-CDS circuit in which variable capacitance is disposed in a feedback circuit side.

FIG. 14 is a block diagram illustrating an A-CDS circuit 20a in which electrostatic capacitance in a feedback circuit side of the amplifier 201 has a variable configuration. As described in FIG. 14, the feedback circuit disposed between the output terminal 2013 of the amplifier 201 and the first input terminal 2011, which is the inverting input terminal, has an additional circuit that is a capacitance variable feedback circuit 2030 in parallel to the feedback switch 202.

The capacitance variable feedback circuit 2030 includes a first feedback capacitor 2031, a second feedback capacitor 2032, a first feedback short-circuiting switch 2033, a first feedback switch 2034, a second feedback short-circuiting switch 2035, and a second feedback switch 2036.

The first feedback short-circuiting switch 2033 prevents a node A of the first feedback capacitor 2031 from being in a floating state. The first feedback short-circuiting switch 2033 closes contacts to shunt the first feedback capacitor 2031 when the first feedback capacitor 2031 is not used. The second feedback short-circuiting switch 2035 prevents a node B of the second feedback capacitor 2032 from being in a floating state. The second feedback short-circuiting switch 2035 closes contacts to shunt the second feedback capacitor 2032 when the second feedback capacitor 2032 is not used. This can increase resistance to noise.

The capacitance variable feedback circuit 2030 changes capacitance of the feedback circuit by combining capacitance of two capacitors, which are the first feedback capacitor 2031 and the second feedback capacitor 2032. This may be achieved by disposing three or more capacitors of electrostatic capacitance in parallel. Disposing a switch for each of three or more capacitors of electrostatic capacitance allows the feedback circuit to change the capacitance more finely.

Figure 15:
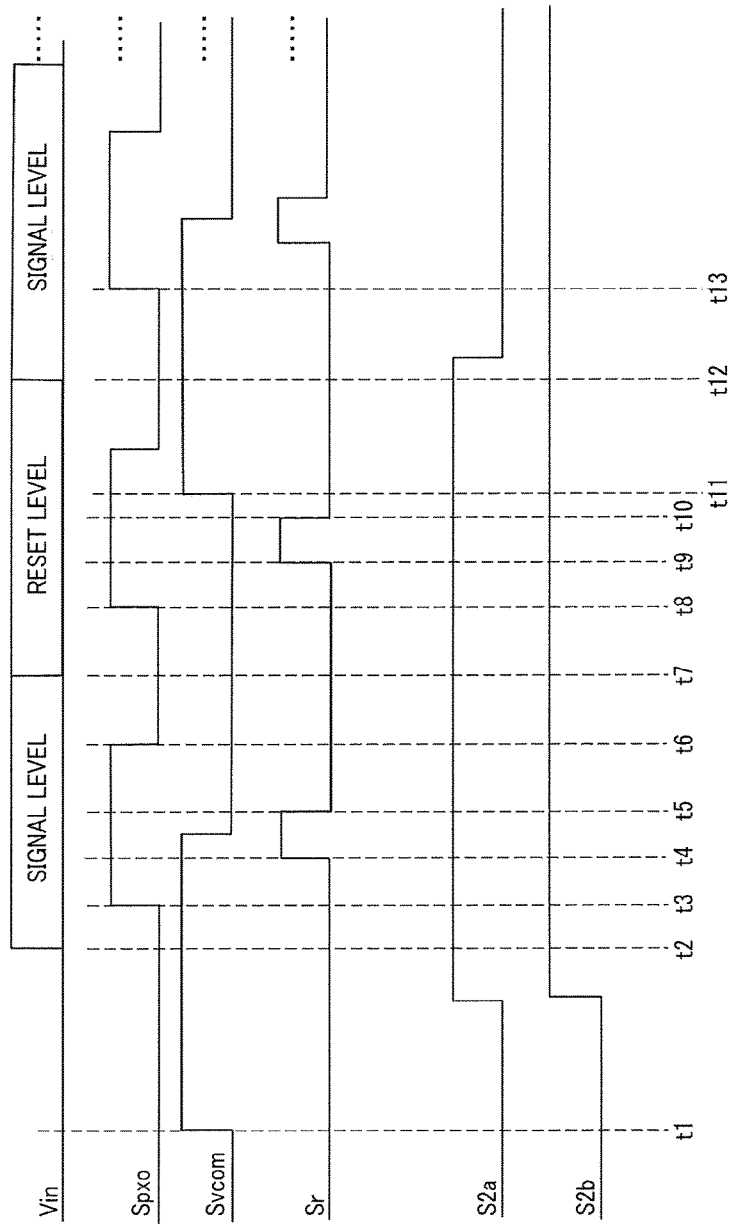
FIG. 15 is a timing chart illustrating an operating state of an analog CDS circuit when the variable capacitance is disposed in the feedback circuit side.

FIG. 15 is a timing chart illustrating an operating state of the A-CDS circuit 20*a*. An arbitrary time is indicated by t1, t2, t3, or the like. The same parts as those shown in the timing chart used to explain the operation of the A-CDS circuit 20 (see FIG. 7) are omitted below.

In FIG. 15, an operating state (timing) of the first feedback switch 2034 is indicated by S2*a*. An operating state (timing) of the second feedback switch 2036 is indicated by S2*b*. The first feedback short-circuiting switch 2033 operates in reverse to the first feedback switch 2034, and the second feedback short-circuiting switch 2035 operates in reverse to the second feedback switch 2036.

If there is no need to change an amplification factor (gain) in the A-CDS circuit 20*a* in relation to time, one or both of the first feedback capacitor 2031 and the second feedback capacitor 2032 can be fixed to a state to be used. In this situation, the both switch included in the capacitance variable feedback circuit 2030 may not perform switching operation at a predetermined time.

As described in FIG. 15, the change of the gain in the capacitance variable feedback circuit 2030 may be generated between after a time t10 at which the ADC circuit 30 starts the AD conversion and by a time t13 which is a time to input a next signal level.

Figure 16:
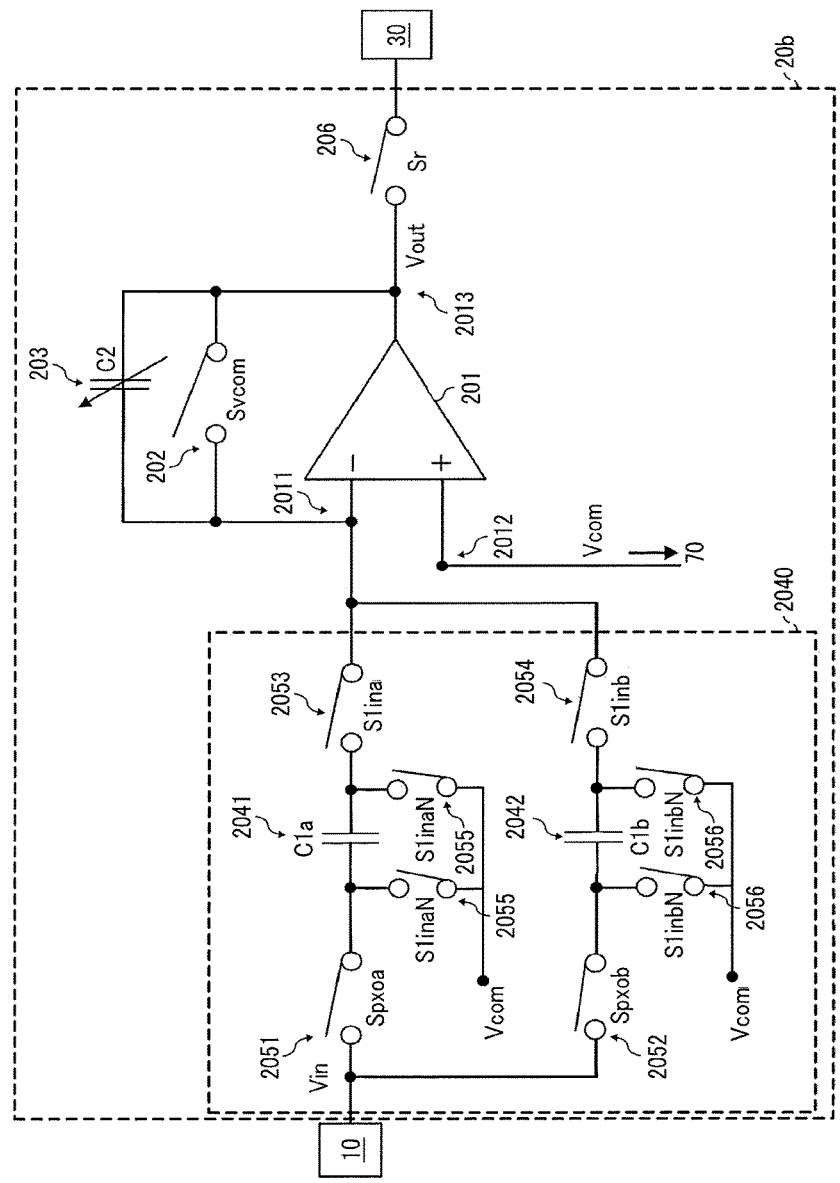
FIG. 16 is a block circuit diagram illustrating an A-CDS circuit in which variable capacitance is disposed in an input side.

FIG. 16 is a block diagram illustrating a configuration of an A-CDS circuit 20*b* in which the electrostatic capacitance in an input side of the amplifier 201 has a variable configuration. As described in FIG. 16, an input circuit disposed between the first input terminal 2011 of amplifier 201 and the pixel circuit 10 includes a capacitance variable input circuit 2040.

The capacitance variable input circuit 2040 can vary the capacitance in the input side by appropriately switching between a first input capacitor 2041 and a second input capacitor 2042. One end of the first input capacitor 2041 is connected to a first input switch 2051 that switches a connection state with a pixel circuit 10 side. The other end of the first input capacitor 2041 is connected to a first capacitance switch 2053 that switches a connection state with the amplifier 201. One end of the second input capacitor 2042 is connected to a second input switch 2052 that switches a connection state with a pixel circuit 10 side. The other end of the second input capacitor 2042 is connected to a second capacitance switch 2054 that switches a connection state with the amplifier 201. Each end of the first input capacitor 2041 is also connected to one of first capacitance short-circuiting switches 2055 that applies the clamp reference voltage (Vcom) to be short-circuited when the first input capacitor 2041 is not in use. Each end of the second input capacitor 2042 is also connected to one of second capacitance short-circuiting switches 2056 that applies the clamp reference voltage (Vcom) to be short-circuited when the second input capacitor 2042 is not in use.

The capacitance variable input circuit 2040 having the above-mentioned configuration is connected to a stable reference voltage, such as for example, the clamp reference voltage (Vcom) so that potential of the both ends of the first input capacitor 2041 and the second input capacitor 2042 is prevented from being in a floating state. In using a reference voltage other than the clamp reference voltage (Vcom), the first capacitance switch 2053, the second capacitance switch 2054, the first capacitance short-circuiting switch 2055, and the second capacitance short-circuiting switch 2056 are set before the A-CDS circuit 20*b* operates. This prevents noise caused by switching operation from being input into the amplifier 201.

Figure 17:
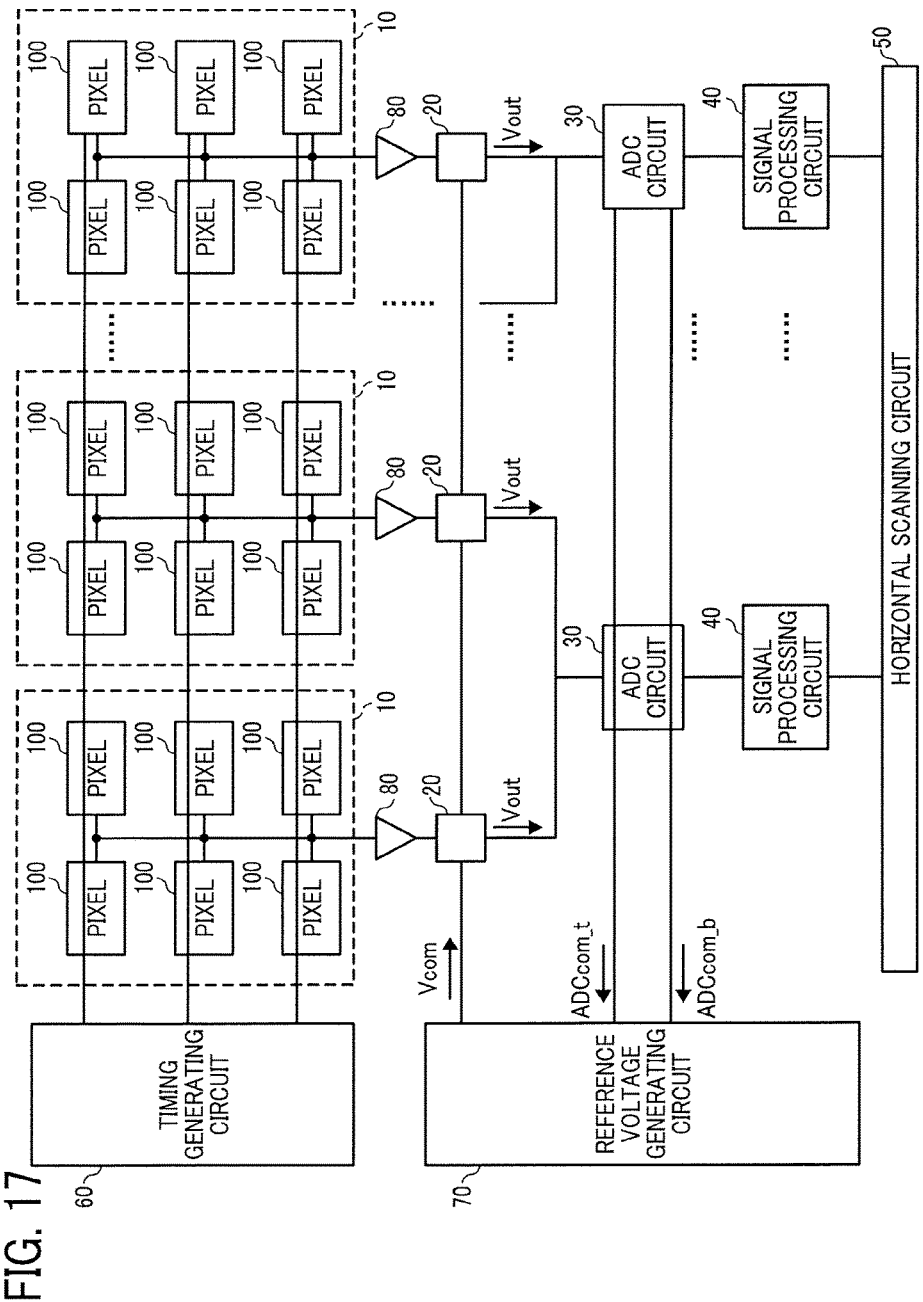
FIG. 17 is a block diagram illustrating an exemplary configuration of a solid-state image sensor according to still another embodiment.

A solid-state image sensor according to still another embodiment will now be described below. FIG. 17 is a block diagram illustrating a configuration of a CMOS sensor 3 that is different from the CMOS sensor 1 in that two or more of the A-CDS circuits 20 are connected to one of the single ADC circuits 30. As described in FIG. 17, the configuration in which the two or more of A-CDS circuits 20 are connected to the ADC circuit 30 is effective when the A-CDS circuit 20 has a low operating speed, or the ADC circuit 30 has a fast sampling rate. Additionally, a switch may be disposed between the ADC circuit 30 and the A-CDS circuit 20 to control a connection between the A-CDS circuit 20 and the ADC circuit 30.

Switching between or among the two or more A-CDS circuits 20 for use increases the operating speed of the CMOS sensor 3 as a whole.

Figure 18:
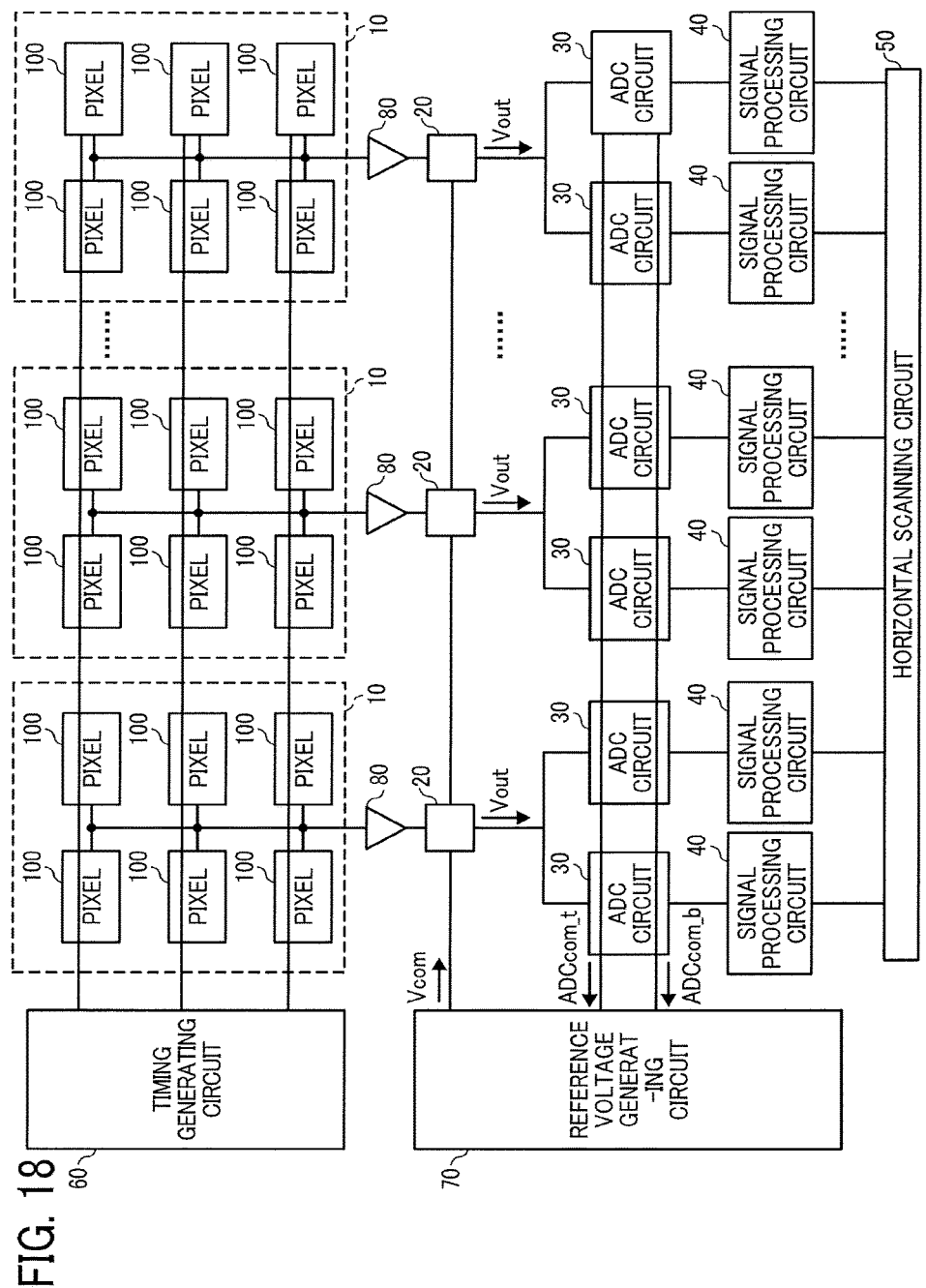
FIG. 18 is a block diagram illustrating an exemplary configuration of a solid-state image sensor according to still another embodiment.

A solid-state image sensor according to still another embodiment will now be described below. FIG. 18 is a block diagram illustrating a configuration of a CMOS sensor 4 that is different from the CMOS sensor 1 and the CMOS sensor 3 in that one of the A-CDS circuits 20 is connected to two or more of the ADC circuits 30. As described in FIG. 18, the configuration in which the one of the A-CDS circuits 20 is connected to the two or more of the ADC circuits 30 is effective when the A-CDS circuit 20 has a high operating speed, or the ADC circuit 30 has a low speed sampling rate.

Additionally, a switch may be disposed between the ADC circuit 30 and the A-CDS circuit 20 to control a connection between the A-CDS circuit 20 and the ADC circuit 30. Switching between or among the two or more ADC circuits 30 for use increases an operating speed of the CMOS sensor 4 as a whole.

Alternatively, a CMOS sensor may have a configuration in which the configuration of the CMOS sensor 3 and the configuration of the CMOS sensor 4 are combined so that a connection state between the two or more A-CDS circuits 20 and the two or more ADC circuit 30 changes. This configuration can achieve a suitable connection state between the A-CDS circuit 20 and the ADC circuit 30 and perform high speed signal processing with high accuracy, accordingly.

Figure 22:
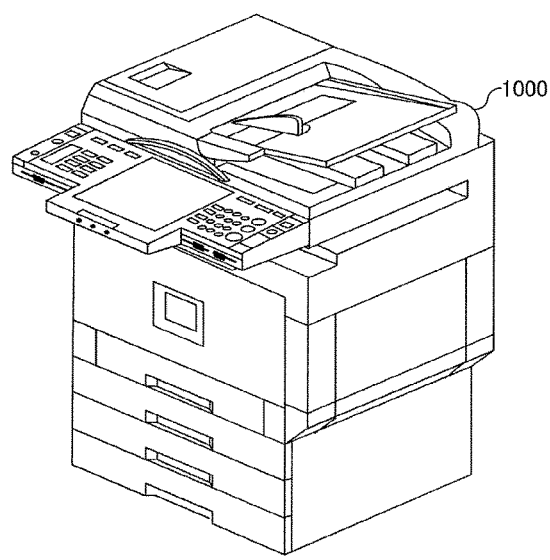
FIG. 22 is a schematic view illustrating an image reading apparatus according to an embodiment.

An image reading apparatus according to one embodiment will now be described below. FIG. 22 is a schematic view illustrating a multifunction peripheral (MFP) 1000 according to the embodiment. The MFP 1000 is a complex machine that may be used as a printer, a fax machine, a scanner, and a copier. The MFP 1000 includes a solid state image sensor that reads a document placed on a document table. The MFP 1000 may use any one of the solid-state image sensors according to the embodiments described above, for example such as the CMOS sensor 1. In using, for example, the CMOS sensor 1, the CMOS sensor 1 can read an image on the document by repeatedly scanning in a sub-scanning direction while moving in a main scanning direction, thus allowing the image reading apparatus to achieve high accuracy image reading.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A solid-state imaging device comprising:
   a pixel circuit including a plurality of photoelectric conversion elements each configured to apply photoelectric conversion on incident light, the pixel circuit being configured to output a signal level that reflects an accumulation state of charge by the plurality of photoelectric conversion elements and a reset level that reflects a reset state of the charge;
   an analog correlated double sampling (CDS) circuit connected to the pixel circuit and configured to perform correlated double sampling in an analog region based on the signal level and the reset level output from the pixel circuit and output a result of the correlated double sampling;
   an analog-digital (AD) conversion circuit connected to the analog CDS circuit and configured to convert two different analog signals output from the analog CDS circuit into two digital signals;
   a signal processing circuit connected to the AD conversion circuit and configured to obtain a difference between the two different digital signals output from the AD conversion circuit; and
   a reference voltage generating circuit to output a first reference voltage that defines a clamp level of the analog CDS circuit,
   wherein the analog CDS circuit includes:
      an inverting amplifier having an non-inverting input terminal connected to an output of the reference voltage generating circuit;
      a first electrostatic capacitor disposed between an output terminal and an inverting input terminal of the inverting amplifier;
      a feedback switch disposed between the output terminal and the inverting input terminal in parallel to the first electrostatic capacitor; and
      a second electrostatic capacitor disposed between the pixel circuit and the inverting input terminal.

2. The solid-state imaging device of claim 1 wherein the reference voltage generating circuit generates the first reference voltage based on a top reference voltage and a bottom reference voltage for digital conversion used with the AD conversion circuit.

3. The solid-state imaging device of claim 1 wherein the analog CDS circuit further includes:
   an input switch between the pixel circuit and the second electrostatic capacitor; and
   an output switch between the output terminal and the AD conversion circuit.

4. The solid-state imaging device of claim 3 wherein, after the analog CDS circuit outputs the first reference voltage that defines a clamp level, the AD conversion circuit starts digital conversion after the output switch closes contacts of the output switch and then the feedback switch opens contacts of the feedback switch.

5. The solid-state imaging device of claim 1, further comprising a clip circuit connected to one of an output of the analog CDS circuit and an output of the AD conversion circuit.

6. The solid-state imaging device of claim 5, wherein the clip circuit comprises a transistor including:
   a source connected to one of the output of the analog CDS circuit and an output of an amplifier included in the AD conversion circuit;
   a drain connected to a power source or to ground; and
   a gate to be input with a second reference voltage.

7. The solid-state imaging device of claim 6, wherein the second reference voltage is generated in the amplifier.

8. The solid-state imaging device of claim 1, wherein at least one of the first electrostatic capacitor and the second electrostatic capacitor has variable capacitance.

9. An image reading apparatus comprising the solid-state imaging device of claim 1.

* * * * *